United States Patent [19]
Earls et al.

[11] 4,194,891
[45] Mar. 25, 1980

[54] MULTIPLE BED RAPID PRESSURE SWING ADSORPTION FOR OXYGEN

[75] Inventors: David E. Earls, Suffern; Gary N. Long, Putnam Valley, both of N.Y.

[73] Assignee: Union Carbide Corporation, New York, N.Y.

[21] Appl. No.: 973,551

[22] Filed: Dec. 27, 1978

[51] Int. Cl.$^2$ ............................................. B01D 53/04
[52] U.S. Cl. ........................................ 55/26; 55/58; 55/62; 55/75; 55/162; 55/179; 55/389
[58] Field of Search ................... 55/25, 26, 58, 62, 75, 55/162, 179, 389

[56] References Cited

U.S. PATENT DOCUMENTS

| | | | |
|---|---|---|---|
| 2,944,627 | 7/1960 | Skarstrom | 55/58 X |
| 3,069,830 | 12/1962 | Skarstrom et al. | 55/62 X |
| 3,164,454 | 1/1965 | Wilson | 55/58 X |
| 3,237,377 | 3/1966 | Skarstrom | 55/62 X |
| 3,430,418 | 3/1969 | Wagner | 55/25 |
| 3,636,679 | 1/1972 | Batta | 55/75 X |
| 3,738,087 | 6/1973 | McCombs | 55/58 |

FOREIGN PATENT DOCUMENTS

1437344  5/1976  United Kingdom ................ 55/25

OTHER PUBLICATIONS

P. H. Turnock, *The Separation of Nitrogen and Methane by Pulsating Flow Through a Fixed Molecular Sieve Bed*, U. of Mich. Thesis, Feb., 1968.
P. H. Turnock et al., *Separation of Nitrogen and Methane via Periodic Adsorption*, AIChE Journal, 17, 335 (1971).
D. E. Kowler, *The Optimization of the Cycle Operation of a Molecular Sieve Adsorber*, U. of Mich. Thesis, 1969.
D. E. Kowler et al., *The Optimal Control of a Periodic Adsorber*, AIChE Journal, 18, 1207 (1972).

*Primary Examiner*—Robert H. Spitzer
*Attorney, Agent, or Firm*—John C. Le Fever

[57] ABSTRACT

A rapid adiabatic pressure swing adsorption system for oxygen production using two or three beds of crystalline zeolite molecular sieve.

11 Claims, 15 Drawing Figures

CYCLE IN SECONDS (FEED, EXHAUST, PRODUCT REPRESSURIZATION)

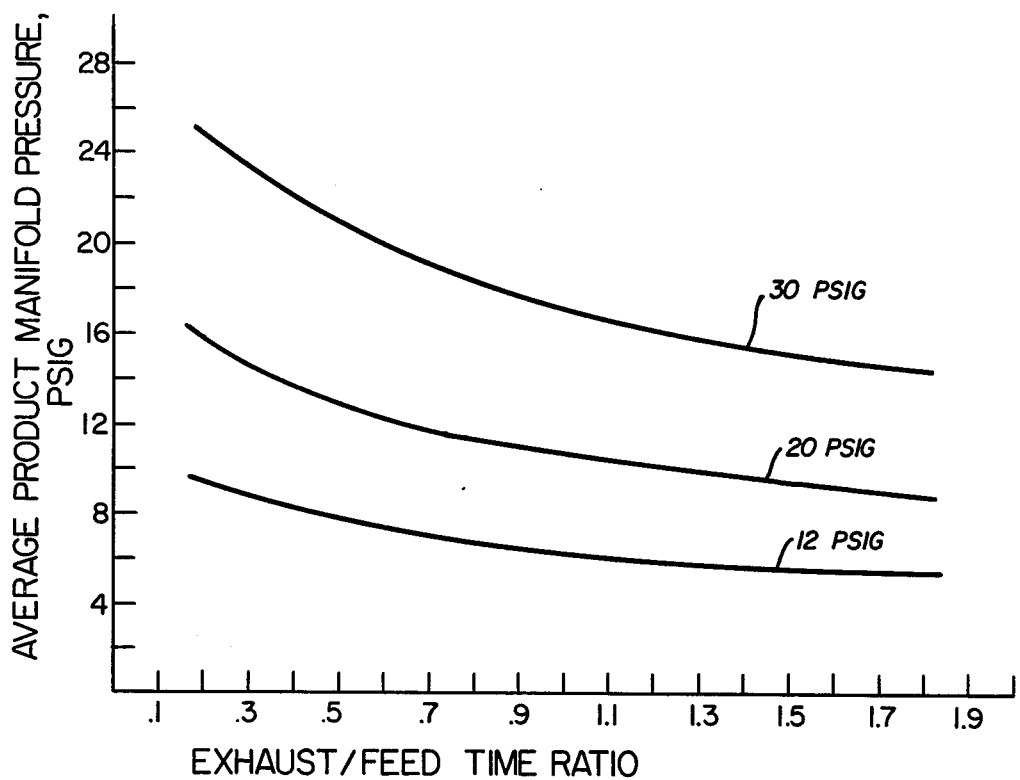

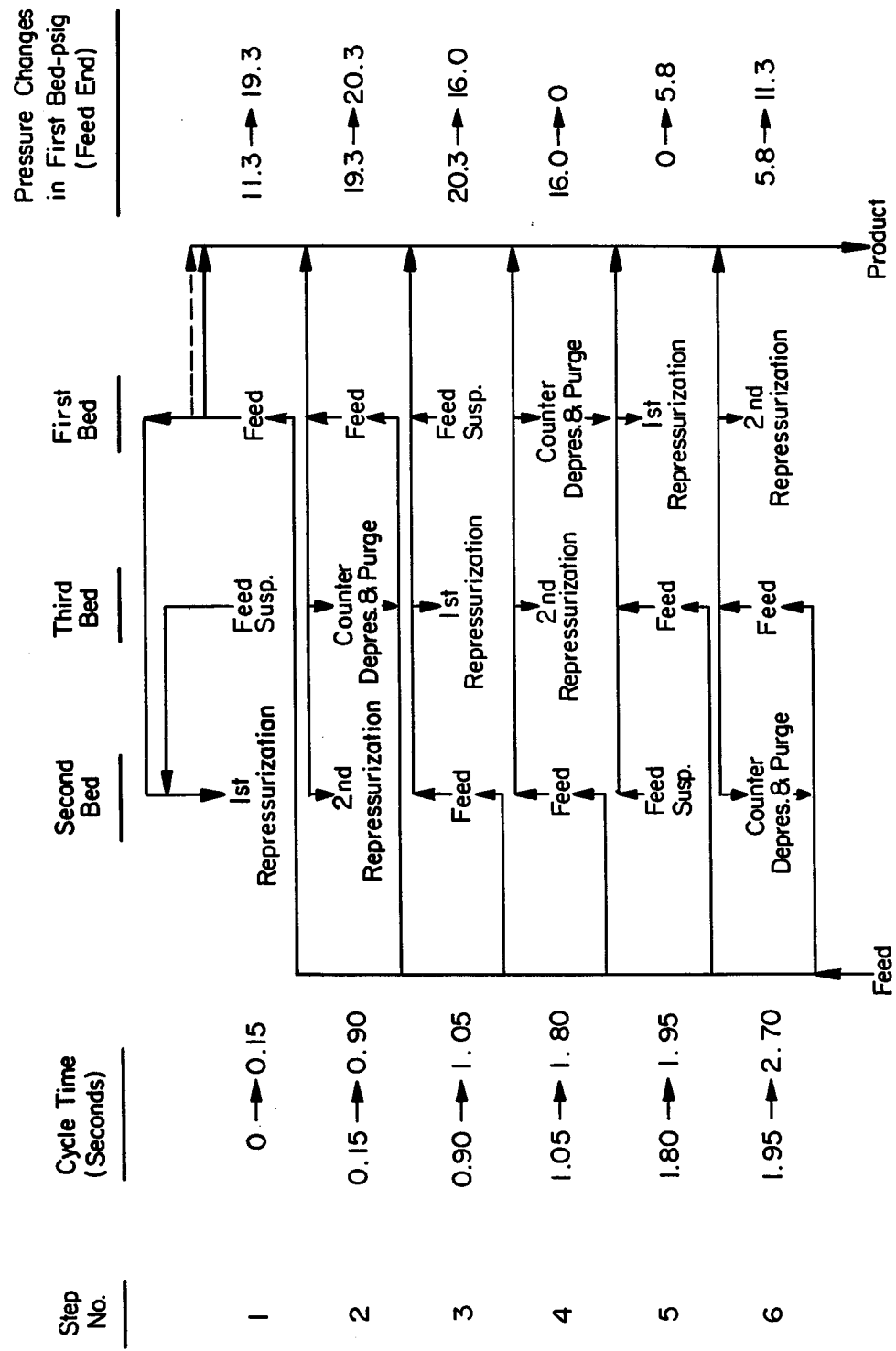

MULTIPLE BED RAPID PRESSURE SWING ADSORPTION FOR OXYGEN

BACKGROUND OF THE INVENTION

This invention relates to a process of and apparatus for separating air to produce oxygen-enriched gas.

Oxygen-enriched gas from air separation has many uses, for example as a breathing atmosphere. In some instances, the users are people suffering from respiratory ailments such as emphysema who need a readily-available oxygen supply in the home. In other instances, oxygen is used for high altitude breathing in aircraft.

A common requirement for breathing oxygen is that the source be lightweight. One approach has been to charge specifically designed equipment with liquid oxygen and use built-in means for vaporization on demand, but this system requires an external source of liquid oxygen and is not self-sufficient. Another approach is a pressure swing adsorption of nitrogen in a crystalline zeolite molecular sieve adsorbent, with the unadsorbed gas discharged as oxygen product.

One type of pressure swing adsorption system described in Wagner U.S. Pat. No. 3,430,418 employs four adsorbent beds arranged in parallel flow relationship with each bed proceeding sequentially through a multi-step cycle. Since oxygen product discharge from a given bed is not continuous, the beds are arranged so that at least one of the four beds is always producing product oxygen-enriched gas discharged from the second end. In brief each bed employs an adsorption step in which at least one component of the feed gas mixture is selectively adsorbed from the feed gas introduced at the bed first end and the oxygen-enriched product gas is discharged from the second end of such bed. The previously described adsorption step is usually performed at the highest pressure of the process and is followed by a first depressurization step in which gas discharged from the bed at progressively lower pressure is used to perform other functions in the process, as for example repressurizing another previously purged bed and/or purging still another bed. This first depressurization step is usually in the same direction i.e. cocurrent, as the feed gas previously flowing through the bed during the adsorption step. After the first depressurization step a final depressurization step usually follows and is most commonly countercurrent to the gas flow during the preceding adsorption and first depressurization steps. During this step gas is usually released at the inlet end and contains desorbate. When depressurization is completed, a purge gas is usually introduced at the second end for countercurrent flow through the bed to desorb and sweep out the desorbate at the inlet end. When purging is completed the bed is repressurized with one component-depleted gas in preparation for return to the previously described adsorption step, and the cycle is repeated.

One disadvantage of the previously described type of pressure swing adsorption process is the complexity of the piping and multiple valving required to provide the necessary flow switching. Still another disadvantage is that the cycles are relatively long, resulting in large, heavy beds and equipment. By way of example, in one such system for air separation the total cycle time for each bed to complete the adsorption through repressurization sequence for air separation in a four bed system is about 4 minutes. This means that the production rate of oxygen-enriched product gas per pound of adsorbent (hereinafter referred to as "adsorbent productivity") is relatively low.

The aforedescribed four bed system is used to provide relatively high pressure and high purity (e.g. at least 90% $O_2$) oxygen product at substantially feed air pressure of up to about 100 psig. If lower pressure product is desired as with breathing oxygen, the three bed system described in Batta U.S. Pat. No. 3,636,679 is more suitable. In this system compressed feed air and product oxygen are simultaneously introduced at opposite ends to the same adsorbent bed, the latter gas being obtained from another bed being cocurrently depressurized. The flows are continued until the two beds are pressure equalized, whereupon only the feed air flow is continued for further repressurization prior to release of oxygen product gas from the opposite end.

Further savings in equipment cost may be achieved by the two bed system described in McCombs U.S. Pat. No. 3,738,087. In the McCombs system an increasing pressure adsorption step is employed with feed air introduced to the first end of a partially repressurized adsorbent bed at higher pressure than initially present in such bed. Nitrogen is selectively adsorbed in the bed and oxygen product gas is discharged from the bed second end. The feed air introduction, nitrogen adsorption and oxygen product gas discharge are at relative rates such that the pressure of the adsorbent bed rises from the intermediate pressure to higher pressure at the end of the step.

Notwithstanding these improvements, the previously described pressure swing adsorption systems (hereinafter broadly described as "PSA") have high power requirements and low adsorbent productivity for supplying breathing oxygen to the individual user. In order to change bed pressure in various PSA cycle steps, multiple valves and product gas manifolds are required to isolate individual beds from the rest of the system.

One possible approach to overcoming the previously enumerated disadvantages of multiple bed-relatively long cycle time PSA processes is the rapid pressure swing adsorption process (hereinafter broadly described as "RPSA"). In the RPSA system as for example described by P. Turnock ("The Separation of Nitrogen and Methane by Pulsating Flow Through a Fixed, Molecular Sieve Bed," Ph.D Thesis, University of Michigan, 1968), a single adsorption bed is provided comprising relatively small particles of adsorbent. The adsorbent particle size used by the prior art may, for example be between 40 and 80 mesh whereas with the afore-described multiple bed-relatively long cycle time PSA system the major dimension of individual particles may, for example be 1/16 inch or larger pellets. As used herein, mesh size ranges refer to U.S. standard screen commonly used for sizing small particles. By way of example, "between 40 and 80 mesh" or "−40 +80 mesh" means particles in a size range which pass through a 40 mesh screen and are retained on an 80 mesh screen.

The adsorbent is a crystalline zeolite molecular sieve of at least 5 angstroms apparent pore size, as for example calcium zeolite A ("5A") described in Milton U.S. Pat. No. 2,882,243 and sodium zeolite X ("13X") described in Milton U.S. Pat. No. 2,882,244. Compressed feed air is introduced to the first end of the adsorbent bed and nitrogen is selectively adsorbed from the feed air and oxygen-enriched gas is continuously discharged from adsorbent bed second end into a product conduit with a product surge tank upstream of the discharge valve.

In the RPSA system the small adsorbent particles provide the necessary flow resistance to operate the process whereas in PSA this flow resistance is minimized to reduce pressure drop in the absorbent bed. The aforedescribed flow continues for a predetermined period which will hereinafter be referred to as the "feed air introduction period" and the oxygen-enriched gas discharged from the single bed during this period will be termed the "product gas."

Following the feed air introduction period the feed valve is closed and an exhaust valve in a reverse outward flow conduit joining the inlet end is opened. During the exhaust (reverse outward flow) period nitrogen-depleted (or oxygen-enriched) gas within the adsorbent bed flows in the reverse direction towards the first or inlet end. This gas sweeps nitrogen gas towards the first end after such gas has been desorbed from the adsorbent by pressure reduction i.e., the pressure differential between the gas in the bed during the feed air gas introduction period and the exhaust pressure. Flow reversal occurs in the adsorbent bed while product oxygen is being removed from the second end, and the flow reversal zone moves quickly from the first to the second end during exhaust. As will be explained hereinafter typical times for the feed air introduction period and the second or reverse outward flow period are relatively short and on the order of 0.1 to 10 seconds. Although not essential, RPSA systems often employ a flow suspension or time delay step between the feed air introduction and reverse outward flow, and during such period the feed inlet and exhaust valves are both closed but discharge of oxygen-enriched product gas is continued through the second end.

According to the previously referenced Turnock thesis, research work was done at Esso Research Laboratories on separating air with an RPSA system. Turnock states only that "—The parameters were studied over the following ranges: 20–50 percent feed time per cycle, 15–40 psig. feed gas pressure, 0.25–8.0 cps. cycling frequency and 20–200 standard cubic centimeter of product gas per minute. The feed capacity of the column at 30 psig. feed gas pressure ranged from 0.475 to 13.5 liters per minute for cycling frequencies of 0.25 and 7.6 cps., respectively. Product gas compositions for air feed to the column were as high as 99 mol percent oxygen. The higher compositions generally resulted at the lower product gas flow rates, the higher cycling frequencies, and the higher feed gas pressures.—" Unfortunately there is no direct information on the performance of the Esso single bed RPSA system, either in terms of product recovery (the percent of oxygen in the feed gas which is recovered as product at the second end) or the adsorbent productivity. However, it may be calculated that the product recovery for 99 mol percent oxygen could not have exceeded 1%, and there is no reason to believe that the experimenters achieved higher product recovery when producing lower purity oxygen. A product recovery of 1% is prohibitively low and not acceptable for commercial use even when the feed gas is unlimited as with air separation.

In any type of pressure swing adsorption system the investment cost is the sum of a function of the recovery (reflecting the compressor cost), plus the adsorbent productivity (reflecting the cost of the vessel(s) holding the adsorbent), and other minor items. In general the investment cost is most greatly influenced by the product recovery and this factor represents between 30% and 80% of the investment cost. In general by increasing the product recovery at any given pressure and product purity, one decreases the compressor cost and increases the cost related to the adsorbent holding vessel. Because of the dominating product recovery factor the aforementioned investment cost trade-off emphasizes the importance of relatively high product recovery processes. In addition to investment cost, the practitioner must consider operating expense, i.e. power cost. Whereas the latter is unaffected by adsorbent productivity it is directly affected by product recovery and by feed compression ratio. It will be recognized that product recovery may be increased by increasing the feed pressure but the resulting increase in recovery is more than offset by the increase in compression ratio, and this results in an overall increase in power consumption.

Other researchers have discovered that by employing in a single bed a relatively short feed air introduction period such as 1 second, a feed air suspension period such as 0.5 second and an exhaust period of about 4 seconds, oxygen recovery as high as 15%, and 0.6 scfh. contained $O_2$ per lb. adsorbent (productivity) may be achieved.

There are however several important disadvantages of the single bed RPSA system as compared with multiple bed PSA systems for high purity oxygen production. The delta loading, a measure of adsorbent efficiency on a per cycle basis, is lower because of the smaller pressure swing at the second or product end of the RPSA bed. The oxygen recovery is lower in the RPSA system, primarily because of the lower bed utilization and a higher average pressure in the RPSA bed during the exhaust. Finally, the power consumption is higher in the RPSA system because of the greater pressure drop through the bed.

A disadvantage of the single bed RPSA system when used to supply breathing oxygen is a relatively long "start-up," i.e. the time required for a system to reach desired product flow rate and purity from the moment the air compressor is started. It will be appreciated that this is an extremely important consideration for emphysema victims and in high altitude breathing.

An object of this invention is to provide an improved rapid pressure swing system for separating air to produce high purity oxygen suitable for breathing.

Another object is to provide an improved RPSA air separation system to produce high purity oxygen suitable for breathing, which is lighter and more compact than heretofore proposed systems producing breathing oxygen.

Still another object is to provide an improved RPSA air separation system to produce high purity oxygen suitable for breathing, in which the product recovery and adsorbent productivity are in the aggregate substantially higher than attainable in a single bed RPSA system.

A further object is to provide an improved RPSA air separation system to produce high purity oxygen suitable for breathing, which uses less power than a single bed RPSA system or two bed PSA system.

Another object is to provide an improved RPSA system with shorter start-up time.

Other objects will be apparent from the ensuing disclosure and appended claims.

SUMMARY

This invention relates to a rapid pressure swing process of and apparatus for separating air in two or three adsorption beds to produce at least 35 mol percent oxygen.

The invention is predicated on the discovery that two or three adsorbent beds in a particular range of length may be arranged in a particular manner and sequentially operated in a particular multi step cycle with a particular flow interrelationship and range of step times to achieve a result far superior to a single bed RPSA system for supplying high purity oxygen suitable for breathing purposes.

The process aspect of this invention relates to a rapid pressure swing system to produce at least 35 percent oxygen product gas in which feed air at 10 to 50 psig. is introduced to the first bed end of an absorbent bed having an end-to-end length of 1 to 3.5 feet. The bed comprises crystalline zeolite molecular sieve of at least 5 Angstroms apparent pore size and 40 to 120 mesh particle size, with nitrogen being selectively adsorbed and the oxygen product gas being continuously discharged from the bed second end during a feed air introduction period. A reverse outward flow period follows the feed air introduction period, during which oxygen purging-nitrogen desorbate gas is released from the bed first end, all in a repetitive two step cycle sequence.

In its broadest aspect the improvement comprises at least two and not more than three adsorbent beds arranged in alternating flow sequence with a single product manifold joined to the second end of such beds, each bed having a feed air introduction period of 0.1 to 6 seconds, and a reverse outward flow period with oxygen product gas flowing directly from another bed to the second end as purge gas such that the reverse outward flow period/feed air introduction period time ratio is at least 0.5 but less than 2, and the total cycle time is 0.2 to 18 seconds. Following the reverse outward flow period and prior to the succeeding feed air period, oxygen product gas discharged from a different bed flows directly to the second end of the first mentioned bed without first end gas release, as a product repressurization period not exceeding 1.5 times the feed air introduction period.

As used herein the description of oxygen product flowing directly to the second end of the first mentioned bed (either for purging or repressurization) means there is no intermediate product storage between the beds as for example a product storage tank. The product gas flows directly through the product manifold means from one bed to the other bed. On a volume basis, most of the gas emerging from the bed first end during the reverse outward flow period is nitrogen desorbate rather than oxygen purge gas.

In a preferred embodiment for high product recovery, the feed air introduction period is 0.7 to 4 seconds.

In another preferred embodiment for high product recovery, a feed air suspension period follows the feed air introduction period and precedes the reverse outward flow period, and the feed air suspension period is up to 0.5 times the feed air introduction period.

In the broadest apparatus aspect of the invention for producing at least 35 mol percent oxygen, at least two separate adsorbent beds are arranged in alternating flow sequence each having an end-to-end length of 1 to 3.5 feet comprising crystalline zeolite molecular sieve of at least 5 Angstroms apparent pore size and 40 to 120 mesh particle size. Each bed has a feed air inlet end and oxygen product gas discharge second end. Means are provided for supplying compressed feed air at least at 10 psig., and feed air manifold means are joined at one end thereto and joined at the other end to the first end of each adsorbent bed. A feed air inlet valve is located in the manifold means upstream of each of the bed first ends.

This apparatus also includes reverse outward flow means joined at one end to the first end of each adsorbent bed and an exhaust gas valve therein downstream of each of the first ends. The other end of the reverse outward flow means is open for oxygen purge-nitrogen desorbate gas discharge from the apparatus. Single product gas manifold means are joined at one end to the second end of each adsorbent bed for discharging at least part of the product gas from the apparatus at the other end. There are no flow restriction means or product storage means in the product gas manifold. A product gas discharge valve is joined to the other end of the product manifold means.

The apparatus further includes means for sequentially controlling the gas flows through each of the adsorbent beds such that: (i) compressed feed air is introduced through the feed air manifold means to the bed first end for selective nitrogen adsorption in the bed and discharge of oxygen product gas at the second end into the product manifold means as a feed air introduction period. Part of the product gas flows backwardly through the product gas manifold means into the second bed second end as a reverse outward flow period for desorption and purging thereof, and discharge as purge-desorbate gas through the second bed exhaust valve. (ii) In response to a predetermined control signal the second bed first end exhaust valve is closed to complete the second bed reverse outward flow period. (iii) In response to a predetermined control signal the first bed inlet valve is closed to complete the first bed feed air introduction period; (iv) in response to another predetermined control signal the inlet valve of the purged second bed is opened to start the second bed feed air introduction period. (v) In response to a further predetermined control signal the first bed exhaust valve is opened to start a reverse outward flow period during which gas from said second bed during its feed air introduction period flows through the product gas manifold to the first bed second end for desorption and purging thereof. (vi) In response to a still further predetermined control signal the first bed exhaust valve closes to complete the first bed reverse outward flow period. (vii) In response to an additional predetermined control signal the second bed inlet valve is closed to complete the second bed feed air introduction period. (viii) In response to a still additional predetermined control signal the feed air inlet valve of the purged first bed is opened to start the feed air introduction period of (i). (ix) In response to a still additional predetermined control signal the second bed exhaust valve is opened to start the reverse outward flow period of (i). (x) The aforedescribed sequential control means repeat sequence (i) through (ix) such that each adsorbent bed consecutively proceeds through a corresponding cycle.

When the apparatus comprises only two adsorbent beds, the predetermined control signals (iii) and (iv) are simultaneous and the predetermined control signals (vii) and (viii) are simultaneous, all to assure continuous flow of feed air to the system.

In a preferred embodiment for relatively high feed air pressures, control signal (ii) occurs prior to control signal (iii), and control signal (vi) occurs prior to control signal (vii), such that product gas flow into each purged bed continues as a repressurization period after the reverse outward flow period.

In another embodiment, control signal (iii) occurs prior to control signal (v) to provide a first bed feed air suspension period prior to the first bed reverse outward flow period, and control signal (vii) occurs prior to control signal (ix) to provide a second bed feed air suspension period prior to the second bed reverse outward flow period.

In the two bed apparatus embodiment of the invention preferred for the production of breathing oxygen (at least 75 mole percent $O_2$), two separate adsorbent beds are arranged in alternating flow sequence each having an end-to-end length of 1 to 2 feet comprising crystalline zeolite molecular sieve of at least 5 Angstroms apparent pore size and 40 to 80 mesh particle size. Each bed has a feed air inlet end and oxygen product gas discharge second end. Means are provided for supplying compressed feed air at 10 to 50 psig., and feed air manifold means are joined at one end thereto and joined at the other end to the first end of each adsorbent bed. A feed air inlet valve is located in the manifold means upstream each of the bed first ends.

This two bed apparatus embodiment also includes reverse outward flow means joined at one end to the first end of each adsorbent bed and an exhaust gas valve therein, downstream each of the first ends. The other end of the reverse outward flow means is open for oxygen purge nitrogen desorbate gas discharge from the apparatus. Product gas manifold means are joined at one end to the second end of each adsorbent bed without flow restriction or product storage means, for discharging from the apparatus at the other end. A product gas discharge valve is positioned adjacent to the other end of the product manifold means.

This two bed apparatus further includes means for sequentially controlling the gas flows through each of the adsorbent beds such that: (i) compressed feed air is introduced through the feed air manifold means to the bed first end for selective nitrogen adsorption in the bed and discharge of oxygen product gas at the second end into the product manifold means as a feed air introduction period. Part of the product gas flows into the second bed second end initially for flow therethrough as a reverse outward flow period for desorption and purging thereof, and discharge through the second bed first end exhaust valve. (ii) In response to a predetermined control signal during the first bed feed air introduction period, the second bed first end exhaust valve is closed and the product gas flow into the second end is continued as a repressurization period for the second bed until the pressure therein rises to the product gas discharge pressure from the first bed. (iii) In response to another predetermined control signal the first bed inlet valve is closed to start a first bed feed air suspension period and the repressurized second bed feed air inlet valve is opened to start the second bed feed air introduction period. (iv) In response to a further predetermined control signal the first bed exhaust valve is opened to start a reverse outward flow period during which second bed product gas flows through the first bed for desorption and purging thereof. (v) In response to a still further predetermined control signal during the second bed feed air introduction period the first bed exhaust valve closes and part of the second bed product gas enters the first bed second end as a product repressurization period for the first bed. (vi) In response to an additional predetermined control signal the second bed inlet valve is closed to start a second bed feed air suspension period and the repressurized first bed feed air inlet valve is opened to start the first bed feed air introduction period. (vii) The aforementioned sequential control means repeats sequence (i) through (vi).

In the three bed apparatus embodiment of the invention preferred for the production of breathing oxygen (at least 75 mol percent $O_2$), three separate adsorbent beds are arranged in a parallel flow relationship each having an end-to-end length of 1 to 2 feet comprising crystalline zeolite molecular sieve of at least 5 Angstroms apparent pore size and 40 to 80 mesh particle size. Each bed has a feed air inlet end and an oxygen product gas discharge second end. Means are provided for supplying compressed feed air at 10 to 50 psig., and feed air manifold means are joined at one end thereof and joined at the other end to the first end of each adsorbent bed. A feed air inlet valve is located in the manifold means upstream each of the bed first ends.

The three bed apparatus embodiment also includes reverse outward flow manifold means joined at one end to the first end of each adsorbent bed and an exhaust gas valve therein, downstream each of the first ends. The other end of the manifold means is open for gas discharge from the apparatus.

Single product gas manifold means are joined at one end to the second end of each adsorbent bed and may be joined to the oxygen user at the other end for product gas discharge from the apparatus. A product gas discharge valve is positioned adjacent to the other end of the product manifold means.

The three bed apparatus further includes means for sequentially controlling the gas flows through each of the adsorbent beds such that: (i) compressed feed air is introduced through the feed air manifold means to the bed first end for selective nitrogen adsorption in the bed and discharge of oxygen product gas at the second end into the product manifold means as a feed air introduction period, with part of the product gas flowing into the second bed as a repressurization period for the second bed, along with gas released from the third bed second end during a third bed feed air suspension period during only the first lower pressure part of the second bed repressurization period. (ii) In response to a predetermined control signal during the first bed feed air introduction period the third bed first end exhaust valve opens for flow of part of the first bed product gas into the third bed second end as a reverse outward flow period for desorption and purging of the said third bed. (iii) In response to another predetermined control signal the first bed feed air inlet valve closes to start a first bed feed air suspension period, the second bed feed air inlet valve opens to start its feed air introduction period, and at least part of the first bed released gas flows through the product manifold means to the third bed second end along with oxygen product gas from the second bed as a first lower pressure part of the repressurization period for the third bed. (iv) In response to a further predetermined control signal the first bed first end exhaust valve opens to start a reverse outward flow period of second bed oxygen product gas through the first bed for desorption and purging thereof. (v) In response to a still further predetermined control signal, the first bed first end exhaust valve closes, at least part of the gas released from the second bed second end enters the first bed second end during only the first part of the first bed repressurization period, and part of the third bed product gas enters the first bed second end during the entire first bed repressurization period. (vi) In response to still another predetermined control signal during the first bed repressurization period the second bed exhaust valve is opened to start a reverse outward flow period of third bed product gas through the second bed for desorption and purging thereof. (vii) The aforementioned sequential control means repeat sequence (i) through (vi). Also the second and third bed air inlet exhaust valves are opened and closed in response to additional predetermined control signals, all such that the second bed and third beds sequentially proceed through a corresponding cycle as illustrated in FIGS. 5 and 6.

As previously stated this invention requires a feed air pressure between 10 and 50 psig. Adsorbent productivity is prohibitively low at feed air pressures below 10 psig. and for many end uses such as breathing oxygen the product discharge pressure would be too low. At feed pressures above 50 psig. the increase in product recovery is insufficient to justify the added power requirement.

The invention also utilizes either two or three adsorbent beds. Three instead of two beds permit more flexibility in cycle timing such that it is possible to advantageously use a time period for one of the steps which is longer than the feed air time, e.g. the exhaust step. There is no additional cycle flexibility by virtue of using more than three adsorbent beds, and a disadvantage of additional valving and piping complexity.

In addition to the general discussion of PSA and RPSA systems under "Background of the Invention," there are specific differences between the two types of pressure swing adsorption systems which make them non-analogous. That is, one of ordinary skill in the adsorption art understands that the differences are so important and fundamental that PSA teachings may not be directly applied to RPSA systems. These differences include the following:

1. The total cycle time for the RPSA system of this invention does not exceed 18 seconds. That is, the time for each adsorbent bed to proceed through its entire cycle from the beginning of one feed air introduction period to the next feed air introduction period is no more than 18 seconds. Since feed air is continuously supplied to one of the beds in a sequential manner, the feed air introduction period is the total cycle time divided by the number of adsorbent beds. By way of example, if three beds are used and the total cycle time is 2.7 seconds, the feed air introduction period is $2.7/3 = 0.9$ seconds. The total cycle time for the PSA systems is normally in the range of 1 to 20 minutes, so that the corresponding time for this RPSA system is only a small fraction thereof.

2. During most of the RPSA cycle the adsorbent beds have much higher end-to-end pressure drop than PSA beds, e.g. about 12 psi. per foot of bed length compared to about 0.25 psi. per foot bed length in PSA systems. The higher pressure drops in RPSA are caused in part by higher gas velocities and in part by the small particle size of adsorbents.

3. Because of the much higher end-to-end pressure drop, RPSA beds must be tightly constrained by a bed support system to prevent bed lifting and attrition, e.g. springs compressing a porous support plate onto the surface of the bed. The plate should be rigid, have low pressure drop and not pass adsorbent particles. PSA adsorbent beds do not require supports to hold the beds in compression because gas velocities are sufficiently low such that pressure drop is below about 0.8 times the bed lifting pressure drop.

4. RPSA systems require much smaller adsorbent particle sizes than PSA systems, e.g. $40 \times 120$ mesh particles for this invention versus $8 \times 12$ mesh particles for $O_2$-PSA systems.

5. The product or second end of the RPSA beds in this invention run at nearly constant pressure throughout the entire cycle. The pressure at the product end of PSA adsorbent beds varies substantially, depending on the cycle step.

6. Only one product gas manifold or header is required to contact the product end of the beds in this RPSA system, and there is gas flow connection between the product ends during the entire operating period. This is because of the low permeability in the bed such that it is possible for each bed on a different cycle step to run at a different average pressure even though all beds have the same product end pressure. To change bed pressure in the various PSA cycle steps, multiple product manifolds and valves are required to isolate individual beds or pairs of beds from the rest of the system.

7. There is no feed end pressure equalization step in the RPSA system as required in the three bed $O_2$-PSA systems for maximum oxygen recovery. This eliminates the need for piping and valving between the product and feed ends of the different beds.

BRIEF DESCRIPTION OF THE DRAWINGS

FIG. 5 is a suitable cycle block chart for practice with the three bed FIG. 4 embodiment.

FIG. 6 is a suitable time program for the FIG. 5 cycle with the three bed FIG. 3 embodiment.

FIG. 11 is a graph showing the effect of exhaust and product repressurization time on product pressure, using the same conditions and apparatus as in FIGS. 9 and 10.

DISCUSSION OF PREFERRED EMBODIMENTS

The prior art has taught that in a single bed rapid pressure swing adsorption system, it is advantageous to employ a storage volume for discharged product gas at and in flow-communication with the adsorption bed second end, such that gas stored therein returns to the adsorption bed during the reverse outward flow. This product surge volume reduces product and purge gas flow variations and improves recovery and adsorbent productivity in a single bed system.

It was assumed that a product storage volume would offer the same advantages in the multiple bed RPSA system of this invention. Accordingly, the initial tests with a three bed 1-foot long, 6-inch diameter system included a 2-cubic foot product surge tank. In subsequent efforts to improve performance of this system, the size of the product surge tank was reduced and eventually eliminated, and important advantages resulted. A series of tests with 20 psig. feed air to obtain 90 mol percent oxygen product were performed to quantify these advantages by comparing a three bed and a one bed system, using the same size zeolite 13X adsorbent beds (12 inches long, 2.5 inches diameter) and product surge tank. The particle size distribution was 3.0 wt. % +40 mesh, 71.6% wt. −40+60 mesh, 23.3 wt. % −60+80 mesh, and 2.1 wt. % tem D (three bed no product storage volume) start-up time was only 10 minutes—a 37.5% reduction.

With respect to product recovery the product storage volume greatly improved performance of the single bed system (25.8% vs. 11.6%) whereas the oxygen recovery was marginally higher in the three bed System D without a product surge volume, i.e. 18.2% vs. 16.4%. This opposite relationship illustrates an important and unexpected difference between the single and multiple bed RPSA systems. This improvement was in part due to the discovery that contrary to expectations, about the same volume of product gas is displaced from each adsorbent bed as is introduced during the rapid pulse-like feed introduction period. Accordingly, there is sufficient gas emerging from the second end during this period to provide the quantity needed for purging another bed in addition to supplying repressurization gas and product gas required by the user.

Figure 10:
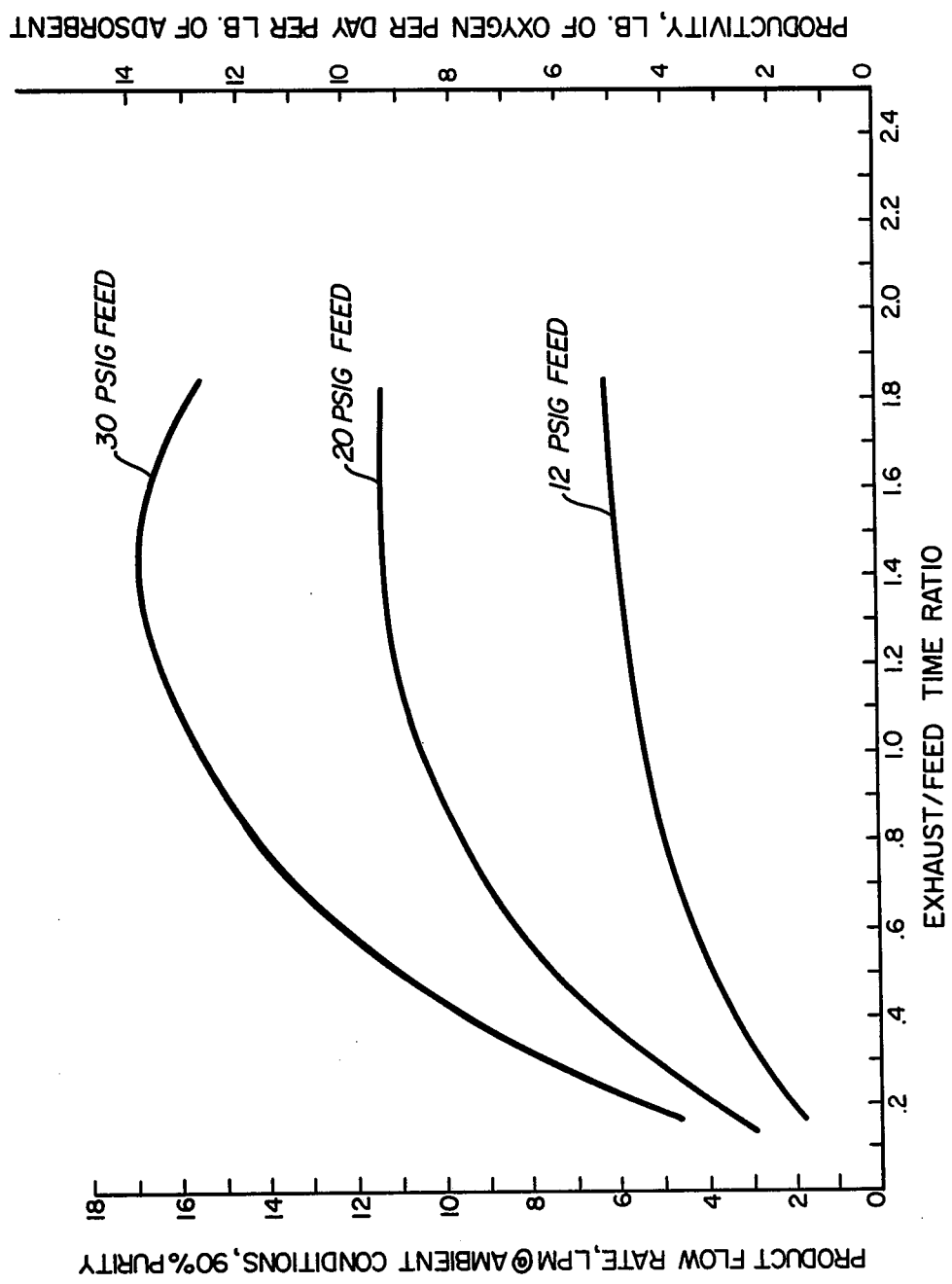
FIG. 10 is a graph showing the effect of exhaust and product repressurization time on adsorbent productivity, using the same conditions and apparatus as in FIG. 9.

It should be noted that the system C and D three bed data is not representative for comparison between single bed and multiple bed product recoveries. This is because it was discovered after the tests that the feed air inlet ends of the system C and D beds were contaminated. Other data obtained on a properly operating 20 psig. feed air, three bed system of the same size is shown in Table A as system E. This data is also shown in FIGS. 10 and 11, discussed hereinafter. Although the start-up time was not measured, the system E data shows that significantly higher oxygen product gas recoveries are obtainable in a multiple bed system than a single bed system without product storage volume and about the same as a single bed with product storage volume.

Table A also shows that whereas a product storage volume greatly improves the adsorbent productivity in a single bed RPSA system, productivity is higher in a multiple bed system without a product surge volume. Moreover, on an absolute basis the adsorbent productivity is significantly higher in the multiple bed than in the single bed system. This is another illustration of the dissimilarity of single and multiple bed RPSA systems.

Figure 1:
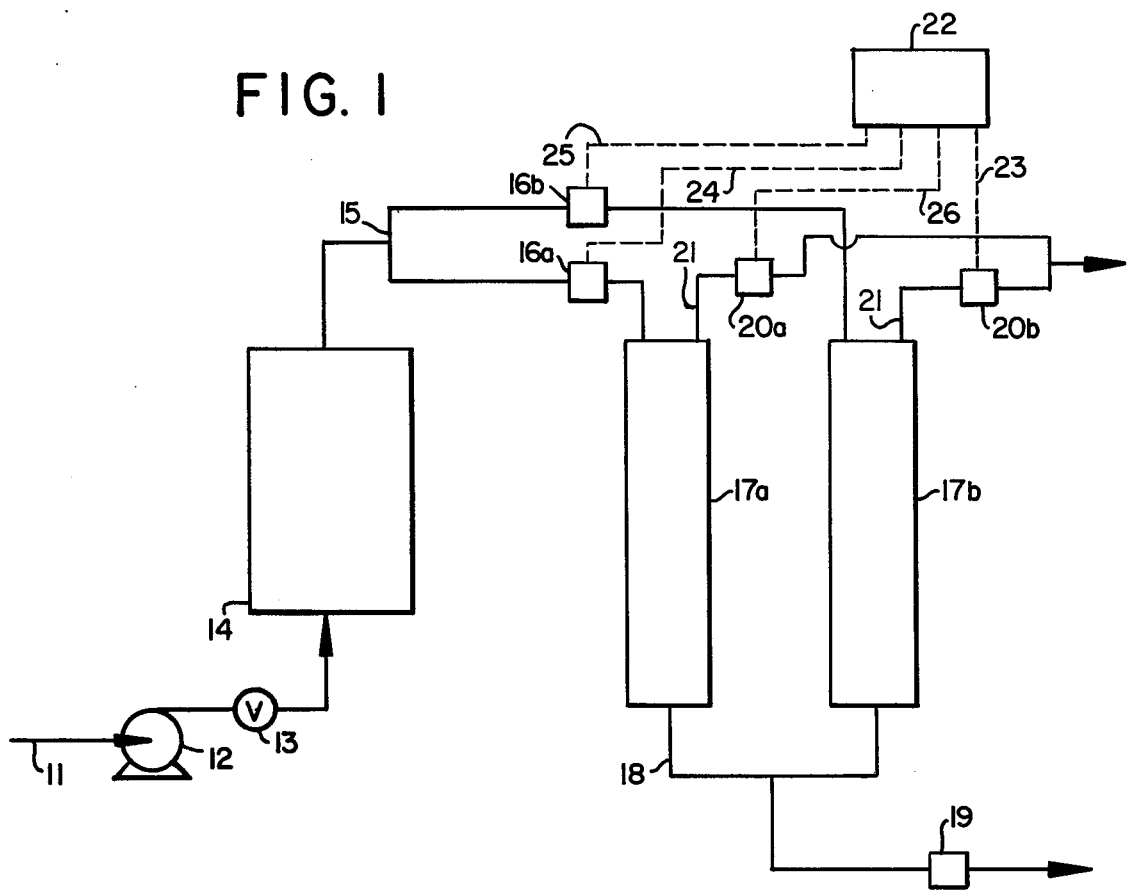
FIG. 1 is a schematic drawing of apparatus suitable for practicing a two adsorbent bed embodiment of the invention.

FIG. 1 illustrates a two bed system in which feed air is introduced through conduit 11 and pressurized by

TABLE A

| System | Effect of Product Storage Volume | | | | |
|---|---|---|---|---|---|
| | A | B | C | D | E |
| Number of Beds | 1 | 1 | 3 | 3 | 3 |
| Product Storage Volume (cu. in.) | 850 | 0 | 850 | 0 | 0 |
| Cycle (seconds) | | | | | |
| Feed air introduction | 0.3 | 0.3 | 0.9 | 0.9 | 0.9 |
| Feed air suspension | 0.3 | 0.3 | 0.15 | 0.15 | 0.15 |
| Exhaust flow | 2.95 | 2.95 | 0.75 | 0.75 | 0.75 |
| Product repressurization | 0.01 | 0.01 | 0.9 | 0.9 | 0.9 |
| Exhaust/feed ratio | 9.84 | 9.84 | 0.83 | 0.83 | 0.83 |
| Total | 3.56 | 3.56 | 2.70 | 2.70 | 2.70 |
| Start-up time (minutes) | 129 | 16 | 41 | 10 | — |
| Product Recovery (90% $O_2$) | 25.8 | 11.6 | 16.4 | 18.2 | 24.4 |
| Adsorbent Productivity (gms. $O_2$/day/gm. adsorbent) | 5.5 | 2.6 | 5.7 | 6.5 | 8.0 |
| Product Pressure (High/Low) | 2.8/3.6 | <1/9 | 11.9/12.1 | 11.7/12.7 | 11/12 |

Inspection of this data shows that elimination of the product surge volume substantially reduced the start-up time for both the prior art single bed and the three bed RPSA systems, but the latter was much shorter thus superior. The System B (single bed-no product surge volume) start-up time was 16 minutes whereas the Syscompressor 12 to the desired level in the 10–50 psig. range and preferably passed through check valve 13 to feed surge tank 14. The latter is desirable to stabilize the feed pressure and thus to smooth out the feed to the tank from the compressor. The flow of feed air to the adsorbent beds from the feed surge tank is desirably a non-steady flow, being allowed to flow unhindered out of the surge tank to the beds during their respective feed periods so as to pressurize the beds in a transient manner. The feed air in surge tank 14 flows to one end of feed air manifold means 15 having two branch conduits each with an inlet valve 16a and 16b and respectively joining at the other end to first adsorbent bed 17a and second adsorbent bed 17b.

A support device (not illustrated) is required at the air inlet end of each adsorbent bed to prevent motion and resultant attrition of the adsorbent particles in the bed. The force required to restrain the bed must overcome static as well as dynamic bed lifting forces created by gas flowing though the bed. By way of example, a suitable device provides 465 lbs. of compression force on the air inlet end of a 2½-inch ID bed expected to operate at a maximum pressure of 22 psig. with inward and outward flow unrestricted except by a ¾-inch orifice.

The adsorbent is crystalline zeolite molecular sieve of at least 5 Angstroms apparent pore size. The latter is often used to identify crystalline zeolites. This apparent pore size is nominally the size of the largest molecule that will have access to the large internal surface area of the molecular sieve zeolites. In order to be useful in adsorption processes, the molecular sieve zeolite must have an apparent pore size larger than the molecular size of the components to be adsorbed. Since most pressure swing adsorption processes are conducted at or near ambient temperature, the apparent pore size for processes involving $O_2$ and $N_2$ must at least be 5 Angstroms. Below this size the difficulty in getting the gaseous molecules into the molecular sieve zeolite or the total exclusion of the gaseous molecules renders the molecular sieve zeolite useless for production of high purity oxygen.

Examples of zeolite useful in the practice of this invention include the naturally occurring molecular sieves such as mordenite, chabazite, erionite and faujasite. In addition to types A and X, useful synthetic molecular sieves include Y, L, $\Omega$, and T. Zeolite Y is described in U.S. Pat. No. 3,130,007. Zeolite L is described in U.S. Pat. No. 3,216,789. Zeolite T is described in U.S. Pat. No. 2,905,952. Zeolite $\Omega$ is described in British Patent Application No. 1,178,186. All of the molecular sieve zeolites have metal cations as part of their structure. For example, zeolite type A is normally synthesized in the sodium form. However, the $Na^+$ ions are readily ion exchangeable with other ions such as $Ca^{++}$ or $K^+$.

Often the exchange of the ions in the zeolite alters the characteristic pore size of the zeolite. It is to be understood that the apparent pore size of 5 Angstroms mentioned earlier refers to the zeolite after it has been ion exchanged. Thus, zeolite A in the as synthesized sodium form having an apparent pore size of about 4 Angstroms or in the potassium cation exchanged form having a pore size of about 3 Angstroms is not suitable.

The particle size of the adsorbent influences both mass transfer and flow resistance. Increasing the mass transfer by reducing the adsorbent particle size tends to increase both the product purity and the adsorbent productivity. However, flow resistance is also increased by a reduction in adsorbent particle size which tends to decrease the productivity at a given purity in the product stream. Since the rate of gas flow through the adsorbent bed in increased as the particle size is increased, the optimum total cycle time for a particular adsorbent bed is shortened. Also the optimum adsorbent bed length is increased as the adsorbent particle size is increased. If mass transfer was so rapid that the gas and the adsorbent were essentially at equilibrium, the optimum adsorbent particle size would be as large as possible to minimize flow resistance. However, at larger and larger adsorbent particle size, the assumption of equilibrium is progressively and increasingly unwarranted, so that an optimum adsorbent particle size exists for each embodiment of the invention. It should also be noted that for a given bed length, feed flow rate per unit cross-sectional area, and pressure adsorbent particle size sets the pressure drop through the bed and a high pressure drop per unit bed length (relative to PSA) is required to operate the RPSA system.

For the experiments hereinafter described, the as-synthesized adsorbent was bonded with a clay from the kaolin or attapulgite group into a convenient pellet form, and ground to the desired size.

As previously stated, this invention requires adsorbent particles smaller than 40 mesh but larger than 120 mesh. It should be recognized however that small quantities of particles outside this range may be used as long as the overall bed permeability is substantially the same as an adsorbent bed having all particles within the 40–120 mesh range. Tests have shown that beds with relatively large particles give poorer results in terms of oxygen recovery than beds with smaller particles. Other data establishes that the product flowrate (adsorbent productivity), although essentially independent of adsorbent mesh size distribution, decreases as the mesh size distribution of particles contains increasing proportions of finer (i.e. 60–80 mesh) material. For these reasons, the use of 40–80 mesh particles for the adsorbent bed represents a preferred balance between obtaining the highest possible oxygen recovery while maintaining high adsorbent productivity. The preferred adsorbent particle size distribution specifications in the practice of this invention are listed in Table B.

TABLE B

| Adsorbent Particle Size Distribution | |
|---|---|
| Mesh Size (U.S. Standard) | Weight % of Total |
| Larger than 40 | 0–4 |
| 40 × 60 (−40 +60) | 62–78 |
| 60 × 80 (−60 +80) | 16–35 |
| Smaller than 80 | 0–5 |

For use in this invention, the adsorbent should be activated so as to contain less than about 1 weight percent residual water and other contaminants.

Figure 2:
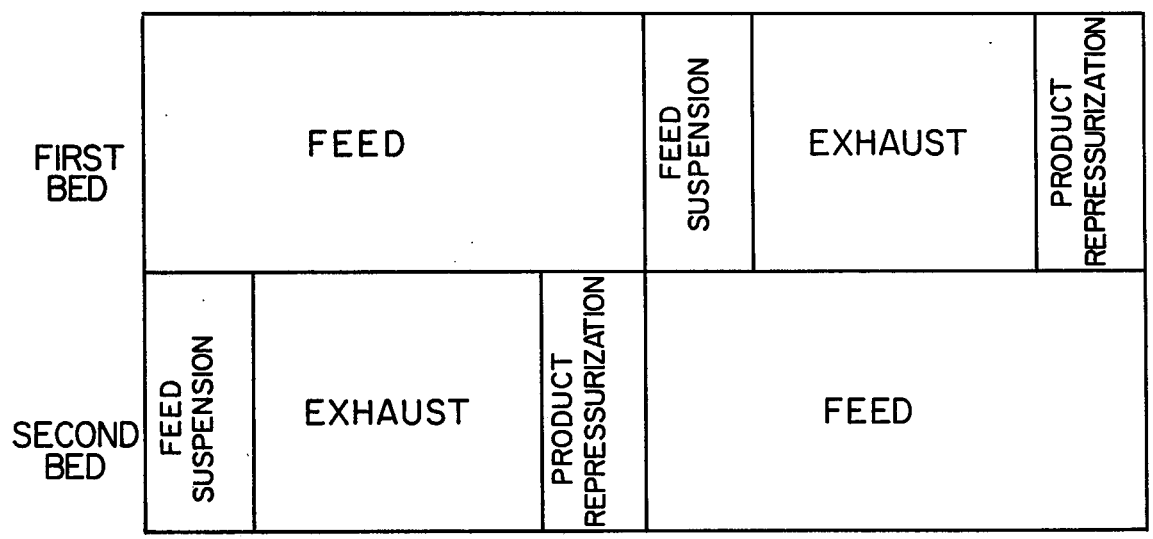
FIG. 2 is a suitable cycle block chart for practice with the two bed FIG. 1 embodiment.

For purposes of explaining a two bed embodiment of the invention, reference will be made to the FIG. 1 apparatus, the FIG. 2 cycle block diagram and the FIG. 3 cycle time-flow chart. It will be assumed that first bed 17a has completed its product repressurization period and is ready for its feed air introduction period. For purposes of illustration it will be assumed that the total cycle time is 8 seconds, so that each bed is receiving feed air for 4 seconds, and the total of the feed air suspension, exhaust and product repressurization periods is also 4 seconds. It will also be assumed that the feed air is supplied at 10 psig., and the bed A pressure changes listed in FIG. 3 approximately correspond to 2 foot long beds of zeolite X particles with the Table B size range specifications.

Figure 3:
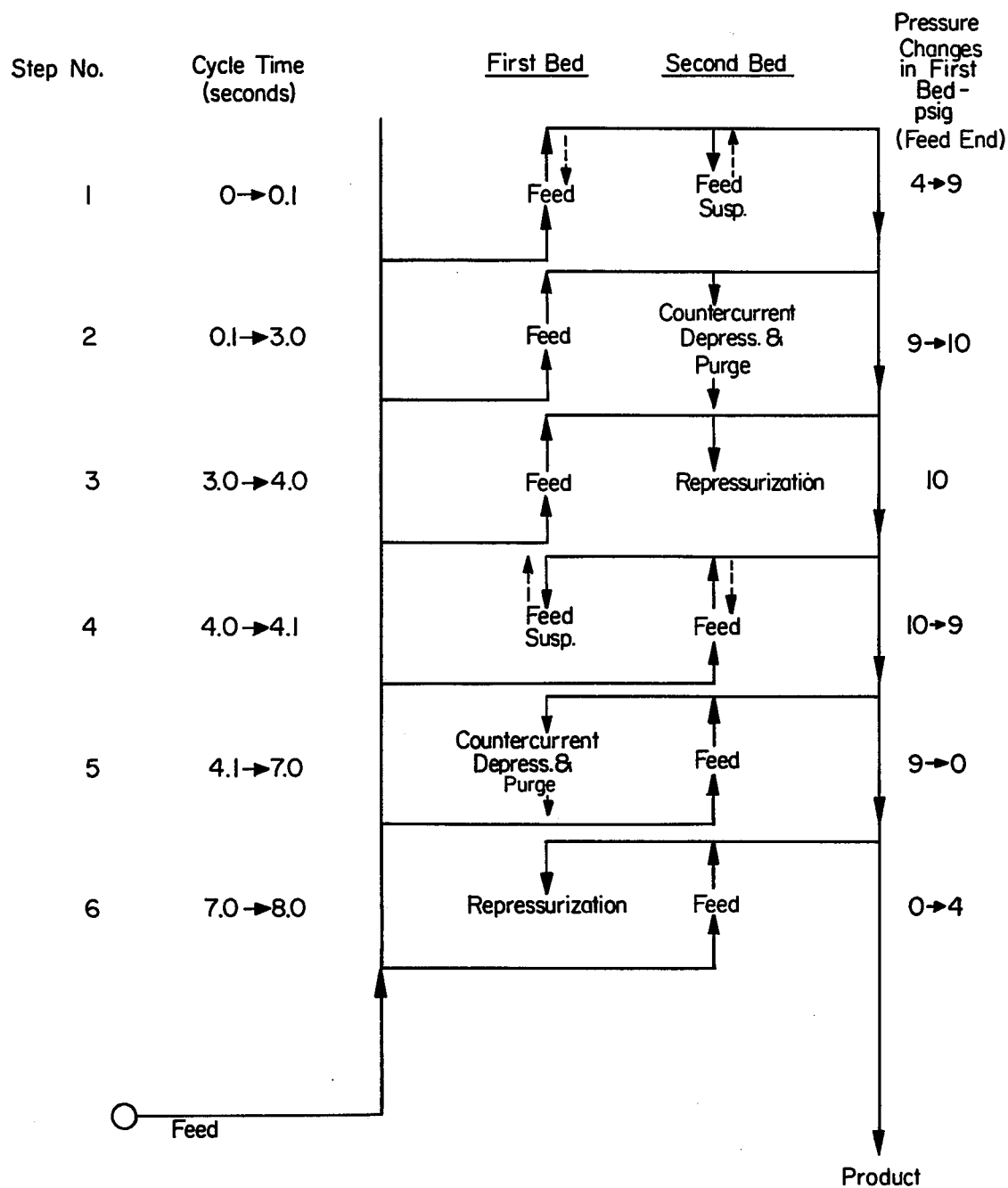
FIG. 3 is a suitable time program for the FIG. 2 cycle with the two bed FIG. 1 embodiment.

As FIG. 3 step 1, feed air is introduced to the bed 17a first end and the pressure at this end rises from about 4 psig. to about 9 psig. At the beginning of this period feed air inlet valve 16b for second bed 17b is closed and the latter initiates its feed air suspension period which is relatively short, e.g. 0.1 second. Product manifold means 18 join the second end of the beds and in this system there is always gas communication between the second ends of all beds through this manifold. Since bed 17a is initially at lower pressure than bed 17b which has just completed its feed air introduction period, product gas initially flows from bed 17b through manifold 18 to both bed 17a (see dotted line) and to the consumer through product flow control valve 19. During this very short period bed 17a is repressurized from both ends, and when the pressure is equalized product gas starts flowing from bed 17a.

It should also be recognized that during this period (step 1 of FIG. 3), both exhaust valves 20a and 20b are closed. Depending on the duration of the feed air suspension step, the duration of the feed air suspension step, the direction of gas flow in bed 17b may change. If the step is very short the flow is only outward through the second end, but at some point the flow may be into the second end from first bed 17a or product manifold 18. For this reason, a flow direction is not shown in FIG. 3.

As step 2 of FIG. 3, on completion of the bed 17b feed air suspension period and in response to a predetermined control signal as for example supplied by timer device 22 through wire 23, second bed 17b exhaust valve 20b opens and part of the first bed 17a product gas flows through manifold 18 into the second end of bed 17b. During this part of the bed 17a feed air introduction period which may for example continue to 3.0 seconds, the pressure in bed 17a first end may increase to about 10 psig. and the oxygen gas entering bed 17a aids in release of the nitrogen adsorbate and purging thereof through exhaust manifold 21 and valve 20b therein. The oxygen purge-nitrogen desorbate gas is discharged the apparatus through the open end of manifold 21.

As step 3 on completion of the bed 17b reverse outward flow period and in response to a predetermined control signal from timer device 22 through wire 23, exhaust valve 20b closes. Product flow into second bed 17b continues as a repressurization period, and the first bed first end pressure remains substantially constant at about 10 psig. to the end of its feed air introduction period—about 4.0 seconds cycle time. By reference to FIG. 2, it will be noted that the feed air introduction period or step of one adsorbent bed is equal to one-half of the total cycle time or more generally 1/n where n equals the number of beds in the system. It will also be noted that in this two bed embodiment the feed air introduction period is equal to the total of the other cycle periods, i.e. feed air suspension, exhaust and product repressurization.

As step 4 of FIG. 3, in response to another predetermined control signal from timer device 22 through wire 24, first bed feed air inlet valve 16a closes to start a first bed feed air suspension period. At the same time another predetermined control signal from timer device 22 through wire 25 opens second bed feed air inlet valve 16b to start the second bed feed air introduction period. During this short step from 4.0 to 4.1 seconds cycle time, first bed 16a first end pressure drops only slightly from about 10 to 9 psig. At least initially there is product gas flow from the second end of first bed 17a into product manifold 18. As previously explained in connection with step 1, the product flow may then reverse and flow from second bed 17b through the product manifold 18 into first bed 17a. During this step the pressure in second bed 17b is increasing and product gas is supplied therefrom to the user.

As step 5 of FIG. 3, in response to a further predetermined control signal from timer device 22 through wire 26, first bed exhaust valve 20a is opened to start a reverse outward flow period. Product gas from second bed 17b flows through manifold 18 into the second end of first bed 17a as purge gas to aid the desorption of nitrogen as the bed first end is countercurrently depressurized from about 9 to 0 psig. Oxygen purge-nitrogen desorbate gas is discharged from the inlet end through reverse outward flow manifold 21 and exhaust valve 20a through the open end of the manifold, all during the period of about 4.1 to 7.0 seconds cycle time.

It should be understood that if desired, a vacuum pump (not illustrated) could be joined to the open of reverse outward flow manifold 21 to enhance desorption. In this event, the terminal pressure of this step would be sub-atmospheric.

As final step 6 of FIG. 3, in response to a still further predetermined control signal from timer device 22 through wire 26, first bed exhaust valve 20a closes and the bed is repressurized by continued flow of product into its second end. The first bed repressurization period continues from 7.0 to 8.0 seconds cycle time and the bed inlet end pressure increases to about 4 psig.

The six step cycle is then repeated, first in response to an additional predetermined control signal from timer device 22 by wire 24 to open first bed feed air inlet valve 16a. At the same time, timer device 22 sends a signal through wire 25 to close second bed feed air inlet valve 16b.

A series of tests were performed using the two bed system of FIG. 1 with 10, 15 and 20 psig. feed air, equal feed, exhaust time cycles of varying duration and no feed air suspension period or product repressurization period. The beds were 20 inches long and 3 inches in diameter, and the adsorbent was −40, +80 particles in a size distribution in accordance with Table B. In one group of beds the adsorbent was zeolite 5A and in the other tests the adsorbent was zeolite 13X, at 10 psig. and 0.125 cycles per second (4.0, 4.0) the feed air flow rate was about 3 cfm. and the product flow rate was 0.1 cfm. at 90% $O_2$. The volume of the feed air surge tank was about 1.9 ft$^3$ and there was no product storage tank. The data from these tests is shown in the FIG. 7 graph with oxygen recovery percent plotted as a function of cycle frequency for zeolite 5A at 10, 15 and 20 psig. (solid lines) and zeolite 13X at 10 and 20 psig. (dash lines).

The data shows that with very long cycles, the oxygen product recovery is low (for example about 4.2% for zeolite 13X at 20 psig. and 6 seconds). This is one reason why the feed air introduction period should not exceed 6 seconds. Another reason is that depending on bed length, an excessively long feed air introduction period can result in nitrogen breakthrough. As the cycle frequency increases the oxygen recovery also increases to a maximum (for example about 16.5% for zeolite 13X at 20 psig. and 3.3. seconds). As cycle time is further decreased the oxygen recovery diminishes (for example about 13.2% for zeolite 13X at 1.6 seconds). The feed air introduction period should be at least 0.1 seconds to permit effective mass transfer into the adsorbent particles. This general relationship is illustrated by the zeolite 13X curves, but the zeolite 5A system was not operated at sufficiently long cycle times to reach the area where the oxygen recoveries are low. The explanation for this oxygen recovery-cycle frequency relationship is as follows:

For very long cycles, the nitrogen adsorption front breaks through the bed second end and product recovery is adversely affected. As the cycle time is shortened, breakthrough is eliminated and with very short cycles product recovery is limited by the mass transfer rate into the adsorbent particles.

Figure 7:
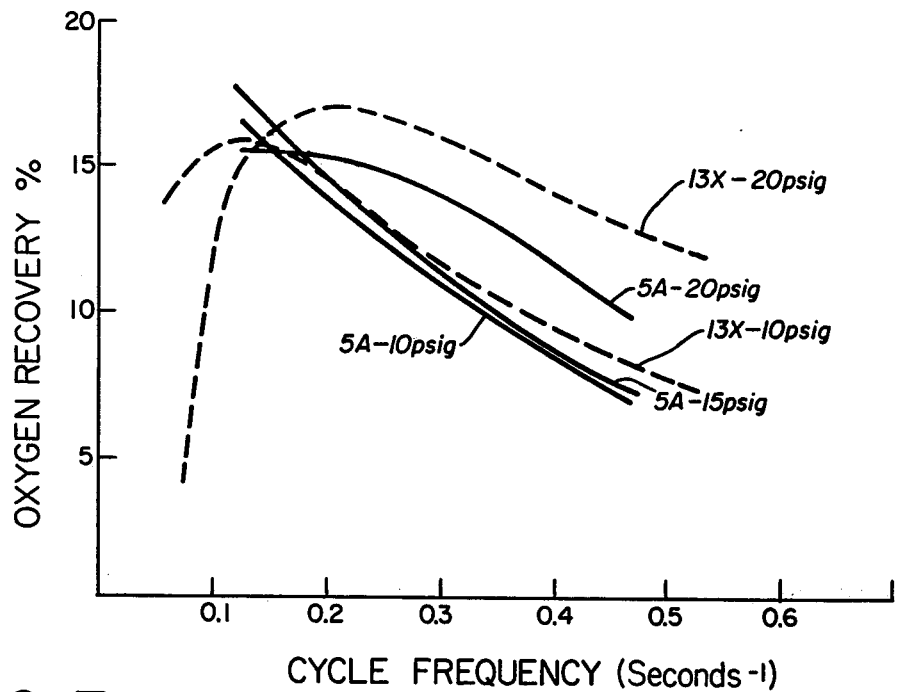
FIG. 7 is a graph showing the effect of total cycle frequency on oxygen recovery using equal feed-exhaust time in a two bed, 20-inch long, embodiment with zeolite 5A adsorbent and 13X adsorbent for 10, 20 and 30 psig. feed air.

FIG. 7 also illustrates that at higher feed air pressures, higher cycle frequencies (shorter cycle times) may be used to achieve a desired oxygen recovery, or higher recoveries.

In a preferred embodiment for high oxygen recovery, the total cycle time is 2 to 8 seconds, i.e. 0.5 to 0.125 cycles per second. In general, longer cycle times should be used with longer adsorbent beds or lower feed air pressure.

The improvement in oxygen product recovery with this invention compared to a single bed RPSA system is also illustrated by a series of tests involving two zeolite 5A adsorbent, −40+80 mesh size beds each 22 inches long and 3 inches diameter. They were each operated with 10 psig. feed air as single beds and in series flow relationship to simulate a two bed system. The cycle was the same in all tests: 4.0 seconds feed air introduction, 0.1 second feed air suspension, and 4.0 seconds reverse outward flow (exhaust). The ratio of exhaust period/feed air introduction period was 1.0 and the total cycle time was 8.1 seconds. For 90% oxygen product the single bed product recovery was about 14% whereas in the two bed system the product recovery was about 18.5%—a 32% improvement.

As previously stated, the optimum RPSA cycle for a single bed is short feed-long exhaust. In the multiple bed systems of this invention, the preferred cycle is about equal feed and exhaust time. The performances of the short feed-long exhaust single bed system and the aforedescribed two bed system using 10 psig. feed air and zeolite 5A adsorbent −40+80 mesh size are compared in Table C.

TABLE C

| Process | Cycle (sec) | Product Purity (% O₂) | O₂ Recovery (%) | Adsorbent Productivity (SCFH contained O₂per lb. adsorbent) |
|---|---|---|---|---|
| Single Bed | 1.0, 0.5, 4.0⁺ | 87.0 | 15.0 | 0.6 |
| Single Bed | 1.0, 0.5, 4.0⁺ | 92.0 | 13.5 | 0.54 |
| Two Beds | 4.0, 0.1, 4.0* | 90.0 | 18.9 | 0.83 |

*Feed, Feed Suspension, Exhaust; Bed 1 180° out of phase with Bed 2.
⁺ Feed, Feed Suspension, Exhaust.

Table C shows that an equal feed-exhaust time two bed system provides an oxygen product recovery which is higher than the short feed-long exhaust time single bed system as optimized for product recovery. The data also establishes that the adsorbent productivity for the two bed system is as much as 60% higher than the single bed system.

Figure 8:
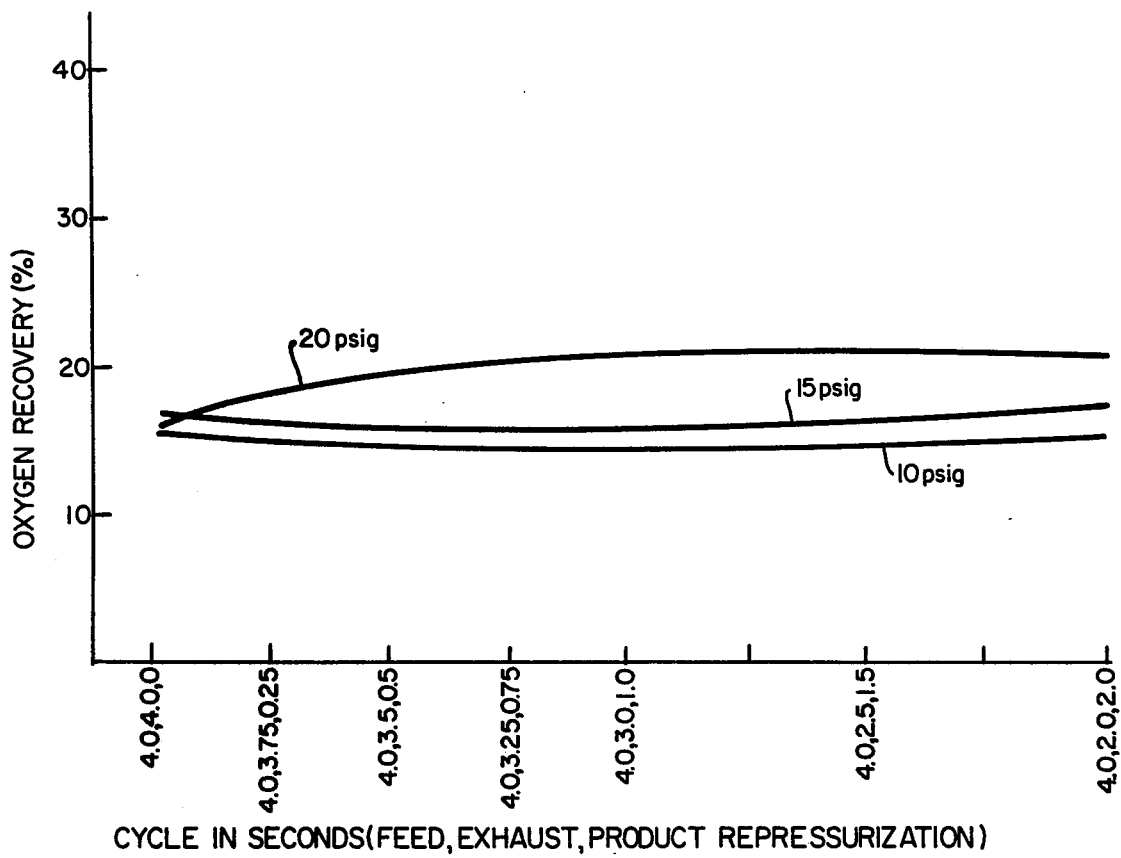
FIG. 8 is a graph showing the effect of exhaust and product repressurization time on oxygen recovery using 8 seconds total cycle time and 4 seconds feed time on a two bed, 20-inch long embodiment with zeolite 5A adsorbent for 10, 15 and 20 psig. feed air.

Another series of tests were performed with the FIG. 1 two bed system (20 inches long and 3-inch diameter) with −40,+80 mesh zeolite 5Z particles in a size distribution in accordance with Table B. The total cycle time was constant at 8 seconds (0.125 cycles/second). A three-step cycle was used (feed, exhaust, product repressurization) and feed time was maintained at 4 seconds but the exhaust/feed time ratio and thus the product repressurization time was varied. The data from these tests is shown in the FIG. 8 graph with oxygen recovery percent plotted as a function of the product repressurization. FIG. 8 shows that for 10 and 15 psig. feed air, there is no benefit in a product repressurization step, and a 4-second feed, 4-second exhaust and 0-second product repressurization cycle (4.0, 4.0, 0) is preferred.

At 20 psig. feed air, product repressurization improves oxygen recovery. This is believed in part due to more rapid breakthrough during the feed step at higher feed pressures as product repressurization is used to reduce the feed gas velocities in the adsorbent bed. That is, with product repressurization the adsorbent bed is partially filled with gas when the succeeding feed air introduction step is initiated, and there is less pressure driving force for pushing the nitrogen adsorption front through the bed. Another probable reason for improved oxygen product recovery at higher feed air pressure with product repressurization is that in these particular tests, the exhaust period was decreased as the product repressurization period was increased. A shorter exhaust period probably reduced loss of oxygen-rich exhaust gas.

Figure 4:
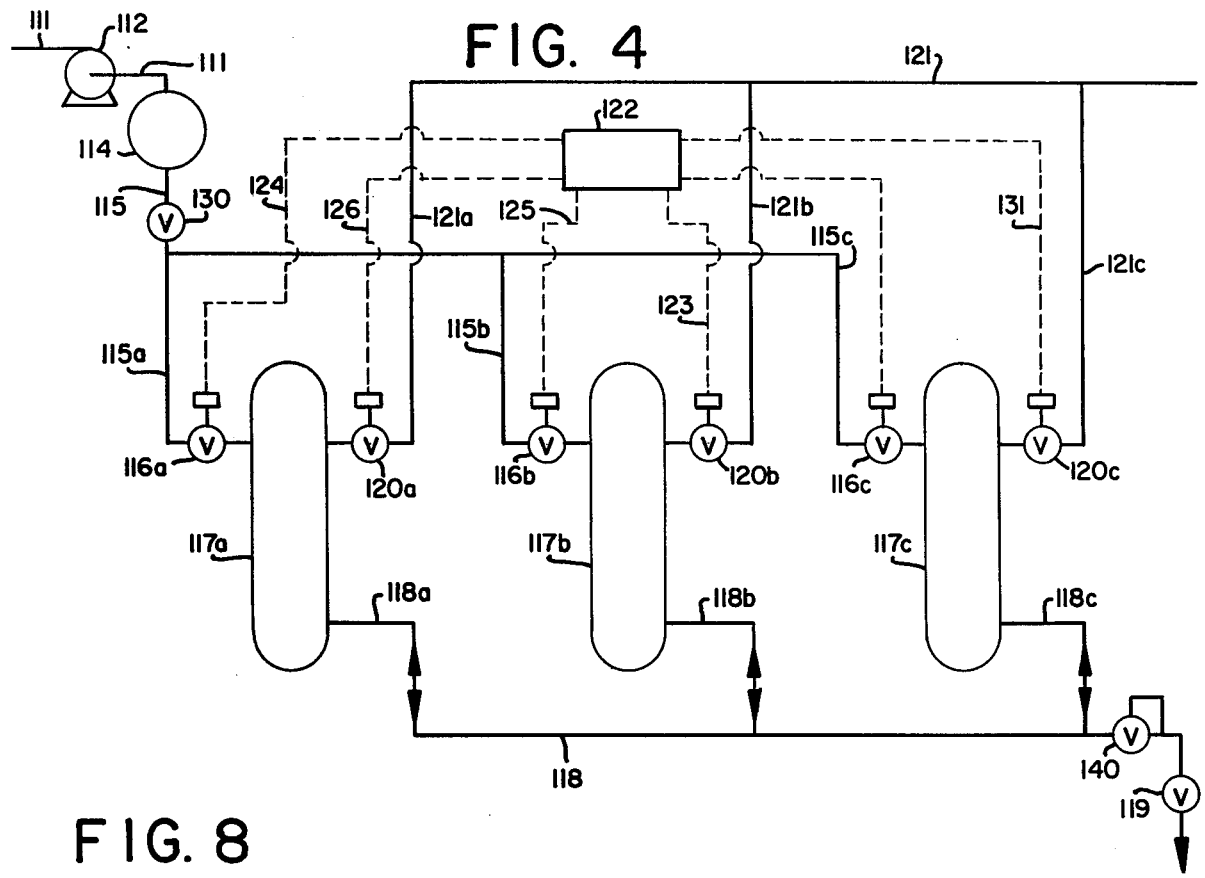
FIG. 4 is a schematic drawing of apparatus for practicing a three adsorbent bed embodiment of the invention.

In the three bed process embodiment of the invention (as illustrated in FIG. 4) to produce at least 75 mol percent oxygen product gas suitable for breathing purposes, feed air at 10 to 20 psig. is sequentially introduced to the first end of each of three adsorbent beds arranged in alternating flow sequence with a single product manifold joined to the second end of such beds. Each bed has an end-to-end length of 1 to 2 feet and comprises crystalline zeolite molecular sieve of at least 5 Angstroms apparent pore size and 40 to 80 mesh particle size.

The feed air introduction period of a first bed is continued for 0.7 to 1.2 seconds while selectively adsorbing nitrogen in the bed and continuously discharging oxygen product gas at pressure of at least 6 psig. A portion of this gas is returned directly to the second end of a second previously purged adsorbent bed as part of the gas for a first lower pressure repressurization period. Thereafter such returning is continued as the gas for all of a second higher pressure repressurization period of the second bed, while simultaneously introducing another part of the product gas to the second end of the third adsorbent bed for a reverse outward flow period in such third bed.

The feed air introduction period of the first bed is terminated while simultaneously initiating the feed air introduction period of the second bed. As a feed air suspension period, the oxygen product gas discharge from the first bed is continued at progressively decreasing first end pressure and for 0.05 to 2 seconds such that the feed air suspension period is 0.04 to 0.3 times the feed air introduction period.

Part of the oxygen product gas discharged from the second bed at substantially constant pressure is introduced to the second end of the third adsorbent bed as part of the first lower pressure repressurization period of the third bed. Oxygen product gas from the second bed is introduced directly to the second end of the depressurized first adsorbent bed as purge, and oxygen purge-nitrogen desorbate gas is released from the first bed first end during a reverse outward flow period such that the reverse outward flow period/feed air introduction period time ratio is 0.5 to 1.1.

As a first lower pressure repressurization period the gas released from the first bed first end is terminated but introduction of oxygen product gas directly from the second bed is continued to the first bed second end during the feed air suspension period of this bed. Also, oxygen product gas from the third bed during the feed air introduction thereof is introduced directly to the first bed second end.

As a second higher repressurization period of the first bed, only the introduction of oxygen product gas from the third bed to the first bed second end is continued. Thereafter the cycle is repeated in the first bed beginning with the feed air introduction period. The second bed and then the third bed are sequentially passed through a corresponding cycle as illustrated in FIG. 6, with a total cycle time for each bed of 2.1 to 3.6 seconds.

For purposes of a detailed description of a three bed embodiment of the invention, reference will be made to the FIG. 4 apparatus, the FIG. 5 cycle block diagram and the FIG. 6 cycle time-flow chart. Where possible, the identification numbers in FIG. 4 correspond by the addition of 100 to those used in the two bed FIG. 1 apparatus to identify the same element. It will be assumed that the total cycle time is 2.7 seconds so that each bed is receiving feed air for 0.9 seconds, and the total of the feed air suspension, exhaust and product repressurization periods is twice the feed air introduction period or 1.8 seconds. It will also be assumed that the feed air is supplied at 20.3 psig., and the first bed pressure changes listed in FIG. 6 correspond to 12 inch long beds of zeolite 13X particles with the Tables B size range specifications. At the beginning of FIG. 6 step 1, bed 117a (first bed in FIG. 6) has previously been repressurized with product oxygen to about 11.3 psig., and feed air is introduced through conduit 111 and pressurized to about 20.3 psig. in compressor 112. The pressurized air flows through feed surge tank 114 to feed air manifold means 115 and optional main feed air control valve 130 therein. Branch conduit 115a joined at the other end to the first end of adsorbent bed 117a has inlet valve 116a therein which is open during the feed air introduction period of this bed. The pressure at the inlet end of bed 117a rises from about 11.3 to about 19.3 psig. Oxygen product gas is discharged from the bed second end into product branch conduit 118a and joining product manifold 118 pressure regulator 140 and flow control valve 119.

Also at the beginning of FIG. 6 step 1, second bed 117b exhaust valve 120b is closed so that part of the bed 117a product gas flows through the second end into this bed for repressurization thereof. During the same step 1, third bed 117c is on its feed air suspension step and gas released from its second end also flows through product manifold 118 at least to the bed 117b second end as part of the product repressurization gas. Step 1 is the first lower pressure part of the second bed 117b repressurization and is of short duration, e.g. 0 to 0.15 seconds of the total cycle time.

As step 2 of FIG. 6, on completion of the bed 117c feed air suspension period and in response to a predetermined control signal from timer device 122 through electric wire 131 during the bed 117a feed air introduction period, bed 117c exhaust valve 120c opens and part of the first bed 117a product gas flows through branch conduit 118c into the second end of third bed 117c. This gas aids in release of the nitrogen adsorbate and purging thereof through branch exhaust conduit 121c and joining manifold 121. At the same time first bed 117a is further repressurized to its maximum pressure of about 20.3 psig. and the second bed 117b completes its second higher pressure repressurization period. This step 2 completes the first bed feed air introduction period of 0.90 seconds, one third of the total cycle time.

As step 3 of FIG. 6, in response to another predetermined control signal from timer device 122 through electric wire 124, first bed feed air inlet valve 116a closes to start a first bed feed air suspension period. At the same time another predetermined control signal from timer device 122 through electric wire 125 opens second bed feed air inlet valve 116b to start the second bed feed air introduction period. During this short step from 0.90 to 1.05 seconds cycle time, the first bed 117a pressure drops from about 20.3 psig. to about 16.0 psig. and at least part of the released gas flows through product manifold 118 to the third bed 117c second end and product gas is supplied to the user. This gas along with oxygen product gas from second bed 117b provides the first lower pressure part of the third bed 117c repressurization period. During this step the pressure in second bed 117b is increasing.

As step 4 of FIG. 6, in response to a further predetermined control signal from timer 122 through electric wire 126, first bed 117a exhaust valve 120a is opened to start a reverse outward flow (exhaust) period. Product gas from second bed 117b flows through manifold 118 into the second end of first bed 117a as purge gas to aid the desorption of nitrogen as the bed is countercurrently depressurized from about 16.0 to 0 psig. Oxygen purge-nitrogen desorbate gas is discharged from the inlet end through branch exhaust conduit 121a to reverse outward flow manifold 121 and exhaust valve 120a therein, all during the period of about 1.05 to 1.80 seconds cycle time. Product gas flows from second bed 117b second end through manifold 118 into third bed 117c second end as the second part of the bed 117c product repressurization period.

As step 5 of FIG. 6, in response to a still further predetermined control signal from timer device 122 through electric wire 126, first bed exhaust valve 120a closes and the bed enters the first lower pressure part of its repressurization period. At least part of the gas released from the second bed 117b second end during its feed air suspension period, and part of the third bed 117c product gas both enter the first bed second end and this bed is repressurized to about 5.8 psig. during the period of 1.80 to 1.95 seconds.

As final step 6 of FIG. 6, in response to still another predetermined control signal from timer device 122 through electric wire 123, second bed 117b exhaust valve 120b opens and part of the third bed product gas flows into the second end of second bed 117b to aid the aforedescribed nitrogen desorption. The nitrogen desorbate-oxygen purge gas is discharged through branch conduit 121b reverse outward flow manifold 121. At the same time another part of the third bed product gas continues to repressurize first bed 117a from 5.8 to 11.3 psig. during the period of 1.95 to 2.70 seconds cycle time.

It will be noted that there are no flow restriction means such as control valves in product manifold 118, 118a, 118b, and 118c. Also there is no product storage vessel in product manifold 118. This represents a substantial advantage in terms of simplified and less costly control in comparison to three bed PSA systems. By way of illustration, the three bed PSA system illustrated in FIG. 3 of previously mentioned McCombs U.S. Pat. No. 3,738,087 requires ten control valves and three interconnected gas conduits.

Although an electrical system has been shown in FIGS. 1 and 4 for sequentially controlling operation of valves joined to the feed air or inlet end of the adsorbent beds, other sequential control means could be employed such as a rotary valve. The latter would have the necessary number of ports joining the appropriate conduits through the valve body as the opening mechanism rotates in a time controlled manner. By way of illustration in the FIG. 1 two bed system, feed air conduits 15 and exhaust conduits 21 would be joined to a rotary valve (not illustrated). In this event, elements 16a, 16b, 20a, 20b and 22–26 are eliminated.

The effect of varying exhaust and repressurization time on oxygen recovery, adsorbent productivity and product pressure in a FIG. 4 type three bed system was demonstrated by a series of tests using 12-inch long, 2.5 inch diameter beds comprising −40, +80 mesh particle size zeolite 13X adsorbent. The particle size distribution was that described in connection with the Table A tests. The feed air introduction, feed air suspension and total cycle times were held constant at 0.9, 0.15 and 2.7 seconds respectively, but the exhaust/feed air introduction time ratio was varied. Since a product repressurization step was also employed, decreasing the ratio means shorter exhaust time and longer product repressurization time. The data from these tests run at 12, 20 and 30 psig. feed air, is plotted in FIGS. 9, 10 and 11.

Figure 9:
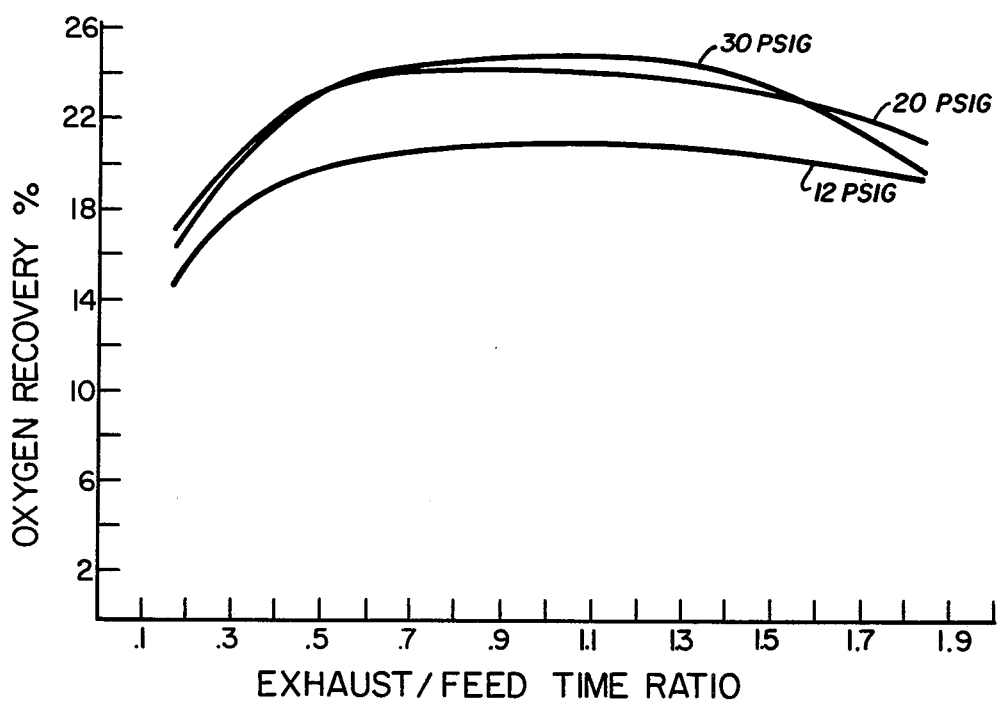
FIG. 9 is a graph showing the effect of exhaust and product repressurization time on oxygen recovery using 2.7 seconds total cycle time, 0.9 seconds feed air introduction time, and 0.15 seconds delay time in a three bed, 12-inch long embodiment with zeolite 13X adsorbent for 12, 20 and 30 psig. feed air.

FIG. 9 is a graph showing oxygen recovery as a function of the exhaust/feed air time ratio. It shows that at all feed air pressures, oxygen recovery increases with increasing exhaust time and decreasing product repressurization time up to an exhaust/feed air time ratio of about 0.5. In this region the slopes of the curves rapidly diminish and very little further improvement in oxygen recovery can be achieved by further increasing the exhaust/feed time ratio. Between about 0.5 and an exhaust/feed air time ratio of about 1.4, the oxygen recovery is about constant and thereafter declines with higher exhaust/feed air time ratios. The oxygen recoveries are higher at 20 and 30 psig. than at 12 psig. and virtually the same at the two higher pressure levels. An explanation for these trends is as follows: For a given bed length, exhaust pressure and particle size, the maximum oxygen recovery attainable is a function of cycle time and feed pressure. It has been found that by chosing an optimum cycle time for any feed pressure in the range of 10–20 psig., the recovery at any purity increases as feed pressure is increased. For air feed pressures of 20–50 psig. the recovery reaches a maximum attainable and becomes a weak function of feed pressure.

FIG. 10 is a graph showing adsorbent productivity as a function of the exhaust/feed air time ratio. It shows that productivity increases with increasing exhaust time up to a particular ratio. With 30 psig. feed air, productivity decreases as the ratio is further increased. Productivity increases with increasing air feed pressure at a particular exhaust/feed time ratio, and with 30 psig. feed air the maximum value was clearly attained as evidenced by change of slope at a ratio of about 1.4. It should be noted however that very little, if any further improvement in adsorbent productivity is realized with 20 psig. feed air beyond a feed/exhaust time ratio of about 1.4 as the curve reaches an asymptotic value at about this value. With 12 psig. feed air the adsorbent productivity still is increasing at ratios above 1.4 but the improvement is relatively small.

As previously stated, the broad range for the exhaust/feed air time ratio is 0.5 to 2.0. The lower limit is based on substantially poorer oxygen recovery and adsorbent productivity below 0.5, and the upper limit is based on lower recovery and productivity values about 2.0 at high feed air pressures.

FIG. 11 is a graph showing oxygen product manifold pressure as a function of the exhaust/feed air time ratio. It shows that the pressure initially decreases rapidly as the ratio increases from very low values, but the rate of decrease diminishes in the region of 0.8 and thereafter the product pressure curves tend to flatten. For breathing oxygen supply the product manifold pressure should be at least 6 psig., so that the feed/exhaust time ratio should not exceed 1.1 (see 12 psig. curve).

It has been previously stated that adsorbent beds in the system of this invention should be at least 1 foot long. The importance of the bed length requirement was demonstrated by a series of tests using various bed lengths and cycle frequencies in two bed systems with 13X zeolite, −40 +80 mesh particle size and particle size distribution in accordance with Table B. The purpose of these tests was to demonstrate the effect of bed length on product oxygen recovery, and the bed lengths were 8¼, 10, and 20 inches. In addition, the three bed, 1 foot long FIG. 9 data may be compared with the two bed data from these tests.

The 8¼ inch beds were operated on a feed air-exhaust-product repressurization cycle with the last two steps of equal duration, and the 20 inch beds were operated on an equal feed-exhaust cycle with no product repressurization. The feed air was supplied at 10 psig. Other data indicates the product repressurization step has little effect on product oxygen recovery at low feed pressure, so this data may be compared and is plotted in FIG. 12. The 8¼-inch beds gave very poor recovery, and only one operating point is shown; for a cycle of 1.0, 0.5, 0.5 seconds (0.5 cycles per second) the oxygen recovery was only 7.8% (see point A). Similar performance was obtained with two 10-inch long beds. A 4-liter product surge tank was added to the 8¼-inch bed system in an attempt to improve performance and unlike the three 1 foot long adsorbent bed system summarized in Table A, there was considerable improvement as evidenced by lower curve B. By way of illustration for the same 1.0, 0.5, 0.5 cycle (0.5 cps.), the oxygen recovery was about 12%. The probable explanation for the difference in the effect of a product surge tank on oxygen recovery between the 8¼-inch and 1 foot beds is that the shorter bed system is not sufficiently long to retain the nitrogen adsorption front unless a product surge tank is used.

Figure 12:
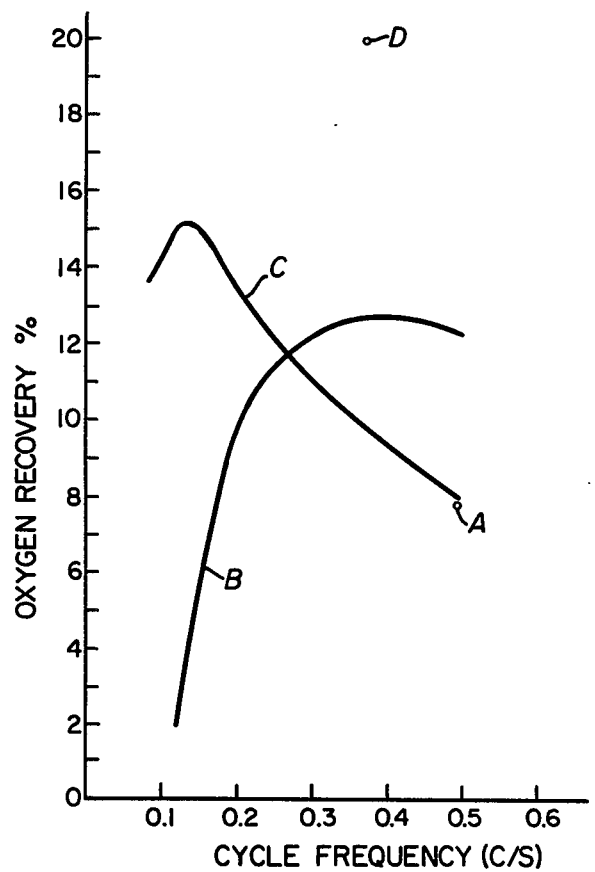
FIG. 12 is a graph showing the effect of bed length on oxygen recovery using two bed systems with zeolite 13X adsorbent and 10 psig. feed air.

For purposes of comparison with even longer beds, the 10 psig. feed air, two bed 20-inch long zeolite 13X system data from FIG. 7 has been shown in FIG. 12 as curve C. It will be apparent that at 10 psig. feed air for two bed systems, substantially higher oxygen recovery is obtained with the 20-inch long beds than with 8¼-or 10-inch beds without a product storage volume. When a product storage volume is added to the 8¼-inch beds, the oxygen recovery is improved but the longer beds (without product surge volume) are superior at longer cycle times where they are most efficient. For example at 0.125 cycles per second (8 seconds total cycle time), the 20-inch beds provide 15.5% oxygen recovery whereas with the 8¼-inch beds and product storage volume, the best oxygen recovery was about 12.5%.

As previously stated, one of the advantages of this invention is the elimination of product surge volume (tank). In addition to improved oxygen recovery, this is desirable because of the additional equipment and operating complexity inherent in a product surge tank. A realistic comparison for the two 8¼ inch long bed-surge tank system is with a three-bed system since a product surge tank is roughly equivalent to an additional adsorbent bed in terms of equipment cost. On this basis, it may be extrapolated from the FIG. 10 curves that for a three bed, 2½-inch diameter and 1 foot long system without a product storage volume, a 2.7 second cycle (0.37 cps.) at 10 psig. feed would provide about 20% oxygen recovery (see point D on FIG. 12). This represents a 60% improvement over the maximum 12.5% oxygen recovery of curve B.

FIG. 12 also shows that the cycle frequency which maximizes oxygen recovery is a strong function of bed length. Increasing the bed length decreases the optimum cycle frequency, i.e. a longer cycle time.

The following examples in Table D illustrates preferred embodiments of the invention for two end uses, i.e. Example 2 is for home breathing and Examples 3–6 are for high altitude aircraft with a requirement that the product be discharged at pressure of at least 6 psig. Example 1 is a single bed RPSA system with the same 1 foot bed length as the Example 2–6 multiple bed systems so may be compared therewith. In each instance the cycle and step times are optimized for the Example 1–3 system dimensions and the feed-product specifications given. The adsorbent was zeolite 13X of 40+80 mesh particle size with particle size specifications in accordance with Table B, and the data is from actual operation.

TABLE D

| | One and Three Bed Comparison | | | | | |
|---|---|---|---|---|---|---|
| Example | 1 | 2 | 3 | 4 | 5 | 6 |
| No. of Beds | 1 | 3 | 3 | 3 | 3 | 3 |
| Bed Length (in.) | 12 | 12 | 12 | 12 | 12 | 12 |
| Bed Dia. (in.) | 6.0 | 2.5 | 6.0 | 5.6 | 5.6 | 5.6 |
| Feed/Exhaust Valve Orifice (in.) | 0.75/0.75 | 0.75/0.75 | 0.75/0.75 | 0.75/0.75 | 0.75/2 × 0.75 (parallel) | |
| Feed Surge Vol. (in.$^3$) | 1900 | 276 | 105 | 2840 | 2840 | 2840 |
| Product Surge Vol. (in.$^3$) | 850 | 5 | 27 | 45 | 45 | 45 |
| Adsorbent (lb.) | 10.3 | 4.5 | 31 | 22.7 | 22.7 | 22.7 |
| Cycle Times (Sec.) | | | | | | |
| Feed Air Intro. | 0.70 | 0.90 | 1.60 | 0.90 | 0.90 | 0.90 |
| Air Suspension | 0.10 | 0.13 | 0.40 | 0.15 | 0.15 | 0.15 |
| Exhaust | 1.36 | 0.75 | 1.80 | 0.85 | 0.85 | 0.75 |
| Prod. Rep. | 0.01 | 0.92 | 1.00 | 0.80 | 0.80 | 0.90 |
| TOTAL | 2.17 | 2.70 | 4.80 | 2.70 | 2.70 | 2.70 |
| Exhaust/feed Ratio | 1.94 | 0.83 | 1.12 | 0.94 | 0.94 | 0.83 |
| Pressures (psig.) | | | | | | |
| Feed (Peak) | 20.0 | 20.0 | 20.0 | 20.0 | 20.0 | 20.0 |
| Exhaust | 0.5 | 0.0 | 0.7 | about 1 | 0.4 | 0.4 |
| Product Hi/Lo | 9.9/6.4 | 11.4/10.6 | 9.9/9.3 | 12/11.5 | 11.2/10.9 | 12/11.1 |
| Flow Rates (scfm. at 60° F.) | | | | | | |
| Feed | 14.9 | 6.23 | 25.2 | 26.6 | 27.8 | 26.6 |
| Product | 0.374 | 0.305 | 1.160 | 1.24 | 1.46 | 1.36 |
| Product Purity, (Vol. %) | 89.5 | 90.4 | 90.1 | 90.0 | 90.0 | 90.0 |
| Product Rec., (Vol. %) | 10.7 | 21.1 | 19.8 | 19.9 | 22.6 | 22.0 |
| Productivity, (lb. O$_2$/day lb. Adsorbent) | 3.95 | 7.45 | 4.10 | 5.95 | 6.85 | 7.08 |
| Relative Power Consumption (per unit volume product) | 2.0 | 1.0 | 1.1 | 1.1 | 0.9 | 1.0 |
| Relative Volume of Adsorbent Bed(s) plus Product Surge (per unit volume per minute product) | 5.3 | 1.0 | 1.5 | 1.3 | 1.1 | 1.2 |

In Examples 1 and 3, a transversely positioned porous tube type header used at the first (feed air-exhaust gas) end, so they are comparable in this respect. In Example 3 it was necessary to place control valves in the product gas conduit joined to each bed (conduit 118a, 118b and 118c in FIG. 4) for adjustment of flow differences between the beds caused by unequal permeability. This problem was eliminated in Examples 4, 5 and 6, and there were no control valves in the product conduits. Also, a plate type header was used and inactive adsorbent volume eliminated so that the adsorbent productivity was substantially increased as compared with Example 3. Another immaterial difference between Example 3 and Examples 4–6 is that the adsorbent bed diameter is slightly smaller, i.e. 5.6 inches as compared with 6 inches.

It is seen from the Table D data that product oxygen recovery for the three bed systems is about double the 10.7% recovery of the Example 1 single bed RPSA system. This value is much lower than the 25.8% recovery in the Table A system primarily because the latter discharged product at substantially atmospheric pressure as contrasted with the 6 psig. requirement of Table D. Other reasons include different flow and pressure drop characteristics through valves, different type of gas headers, and an undersized product surge tank for Example 1. Another demonstrated improvement for this invention is that the large product storage volume required in Example 1 has been eliminated in the multiple bed examples; the product surge volume listed in the table is the volume of the product manifold conduits only. Table D also shows that the adsorbent productivity is higher in the multiple bed systems of this invention.

Still another advantage illustrated by Table D for the three bed system is the higher product pressure. This is due to the shorter exhaust time and continuous air feed, all of which tend to reduce the variation in product pressure.

It will be also noted that the feed surge volume is not included in the relative volume comparison of Table D. The required volume for the Example 1 system would be substantially larger (per unit volume of product) than those for the multiple bed systems because of the continuous flow of air feed in the latter two systems. The large feed surge volume in Examples 4-6 was used in these particular experiments to provide constant feed pressure from the supply to the system, and probably would not be used in commercial practice.

In the previously described experiments demonstrating the advantages of this invention, the oxygen purity of the product gas was about 90 mol percent. However, the system of this invention may be advantageously used to produce at least 35 mol percent oxygen.

Another series of experiments demonstrate that the advantages of the invention include lower than 90 mol percent oxygen production. In these experiments 10 psig. feed air was supplied to the first end of single or multiple beds each 20±0.5 inches long and comprising zeolite 5A adsorbent with kaolin binder having particle size distribution in accordance with Table B. The single bed system included a product surge volume 2.25 liter and this was not used in the two bed system. Since for relatively high oxygen product purities in a single bed system a short feed-long exhaust time cycle provides highest product recovery, but equal feed-exhaust time cycles are preferred with low oxygen product purity, both types of cycles were included in these experiments.

Figure 13:
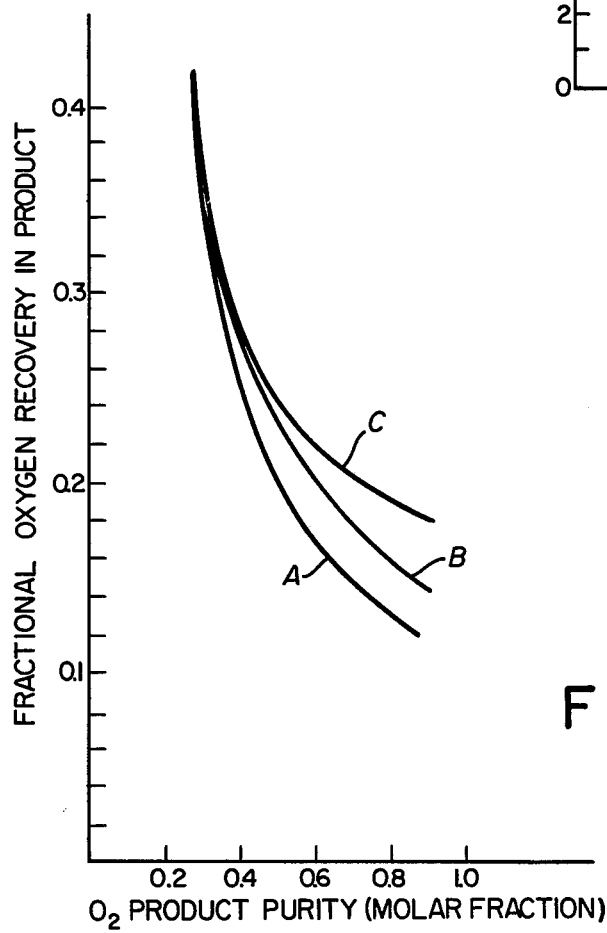
FIG. 13 is a graph showing the relationship between oxygen recovery and purity in a two bed zeolite 5A system and single bed zeolite 5A systems all 20 inches long.
Figure 14:
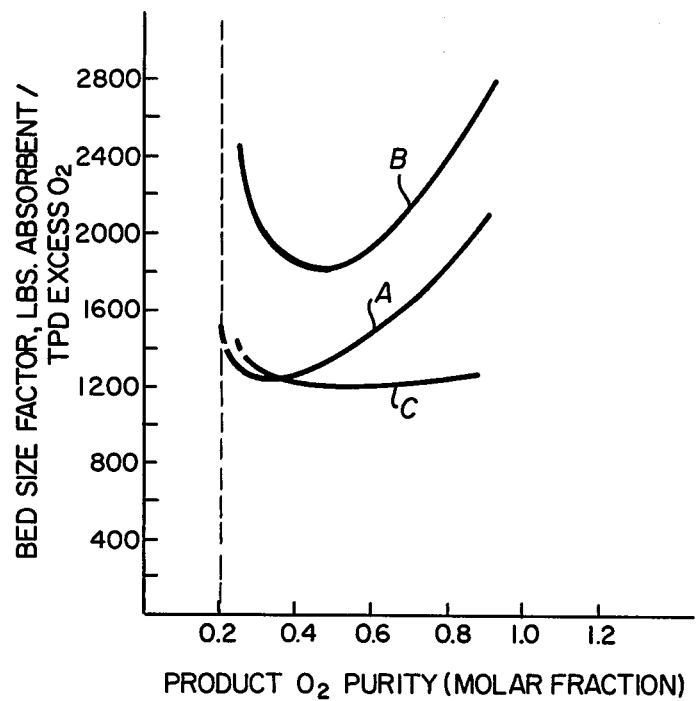
FIG. 14 is a graph showing the relationship between adsorbent productivity and product purity for the FIG. 13 systems.
Figure 15:
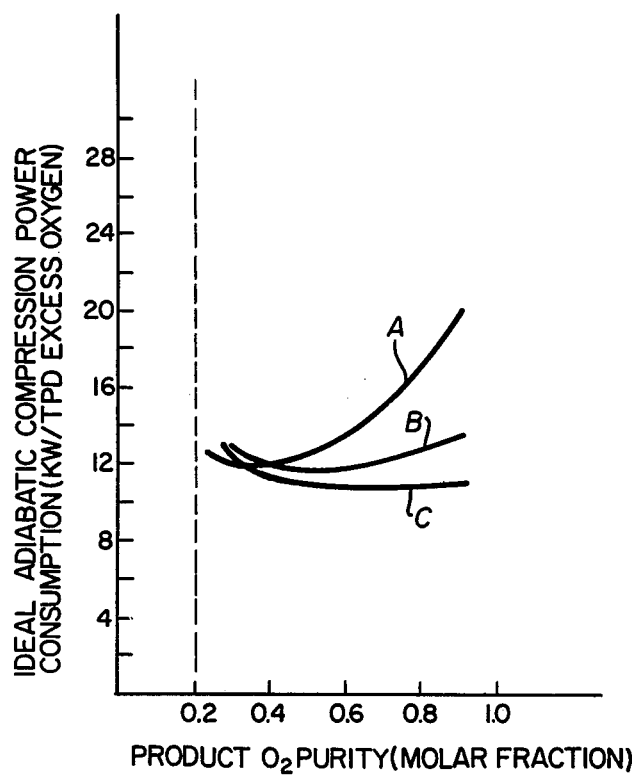
FIG. 15 is a graph showing the power requirements of the FIG. 13 systems as a function of product purity.

The results of these experiments are shown in the FIGS. 13, 14 and 15 graphs and the three tested systems labeled as A, B, and C have the following characteristics:

TABLE E

Characteristics of FIGS. 13-15 Systems

| System | No. Beds | Time Cycle | Cycle Time Distribution (Seconds) |
|---|---|---|---|
| A | One | Equal Feed-Exhaust | 4.0, 0.01, 4.0 |
| B | One | Short Feed-Long Exhaust | 1.0, 0.5, 4.0 |
| C | Two | Equal Feed-Exhaust | 4.0, 0.1, 4.0, 0.1 |

FIG. 13 shows the relationship between oxygen recovery and product purity for the three systems. Although the general trend is lower oxygen recovery with increasing product purity, the curve C system is superior to curve A and B even at 35% oxygen and the advantage increases with increasing product purity.

As used herein, "excess oxygen" is the quantity of oxygen in excess of that which would be present if the stream were air containing 20.9% oxygen. Algebraically, excess oxygen may be expressed as the excess oxygen flow rate E in an oxygen enriched air stream flowing at F scfm. and containing Y present oxygen (Y>20.9%) as follows:

$$E = \frac{F(Y - 20.9)}{79.1} \text{ scfm.}$$

FIG. 14 shows the relationship between adsorbent productivity (in terms of "bed size factor" a function of purity and flowrate of product from an adsorbent bed) and product purity for the same three systems. The equal feed-exhaust time cycle of curve A is superior to the short feed-long exhaust time cycle of curve B for the single bed system at all product purities, but the two bed system of curve C is superior to curve A beginning at about 35% oxygen purity. Moreover, this superiority progressively increases at higher oxygen product purities as curve C remains substantially flat whereas curve A has a substantially constant positive slope. The adsorbent productivity advantage for curve C (this invention) at relatively high product purity such as 90% $O_2$ is very substantial, i.e. about 2100/1300=160%.

FIG. 15 shows the power requirements for the three systems again as a function of oxygen product purity. Unlike the adsorbent productivity relationship of FIG. 14, the short feed-long exhaust time cycle of curve B is substantially superior to the equal feed-exhaust time cycle of curve A for the single bed systems, but the curve C system of this invention has a lower power requirement than curve B at all product purities above about 35% oxygen. This advantage increases with increasing product purity and is about 2/13 or 15% at 90% oxygen.

Although preferred embodiments have been described in detail, it will be appreciated that other embodiments are contemplated only with modification of the disclosed feature, as being within the scope of the invention.

What is claimed is:

1. In a rapid adiabatic pressure swing process for air separation to produce at least 35 mole percent oxygen product gas in which feed air at 10 to 50 psig. is introduced to the first end of an adsorbent bed having an end-to-end length of 1 to 3.5 feet and comprising crystalline zeolite molecular sieve of at least 5 Angstrom apparent pore size and 40 to 120 mesh particle size, with nitrogen being selectively adsorbed and said oxygen product gas being continuously discharged from the bed second end during a feed air introduction period, and a reverse outward flow period following said feed air introduction period during which oxygen purging-nitrogen desorbate gas is released from the bed first end, all in a repetitive two step cycle sequence: the improvement comprising at least two and not more than three adsorbent beds arranged in alternating flow sequence with a single product manifold joined to the second end of such beds, each bed having a feed air introduction period of 0.1 to 6 seconds, a reverse outward flow period with oxygen product gas flowing directly from another bed to said second end as purge gas such that the reverse outward flow period/feed air introduction period time ratio is at least 0.5 but less than 2 and the total cycle time is 0.2 to 18 seconds, and prior to the succeeding feed air introduction period, oxygen product gas discharged from a different bed flows directly to said second end without first end gas release as a product repressurization period not exceeding 1.5 times the feed air introduction period.

2. A rapid adiabatic pressure swing adsorption process according to claim 1 in which the feed air introduction period is 0.7 to 4 seconds.

3. A rapid adiabatic pressure swing adsorption process according to claim 1 in which the total cycle time is 2 to 8 seconds.

4. A rapid adiabatic pressure swing process according to claim 1 in which a feed air suspension period of up to 0.5 times said feed air introduction period follows said feed air introduction period and precedes said reverse outward flow period.

5. A rapid adiabatic pressure swing process for air separation to produce at least 75 mol percent oxygen product gas in which feed air at 10 to 20 psig. is sequentially introduced to the first end of each of three adsorbent beds arranged in alternating flow sequence with a single product manifold joined to the second end of such beds, each bed having an end-to-end length of 1 to 2 feet and comprising crystalline zeolite molecular sieve of at least 5 Angstroms apparent pore size and 40 to 80 mesh particle size; continuing the feed air introduction period of a first bed for 0.7 to 1.2 seconds while selectively adsorbing nitrogen in the bed and continuously discharging said oxygen product gas at pressure of at least 6 psig. while returning a portion thereof directly to the second end of a second previously purged adsorbent bed as part of the gas for a first lower pressure repressurization period, and thereafter continuing said returning a portion of the oxygen product gas as the gas for all of a second higher pressure repressurization period of said second bed while simultaneously introducing another part of said product gas to the second end of the third adsorbent bed for a reverse outward flow period in such third bed; terminating said feed air introduction period of the first bed while simultaneously initiating the feed air introduction period of the second bed and continuing the oxygen product gas discharge from the first bed at progressively decreasing first end pressure as a feed air suspension period of 0.05 to 2 seconds such that the feed air suspension period is 0.04 to 0.3 times the feed air introduction period, and introducing part of the discharged oxygen product gas from said second bed at substantially constant pressure to the second end of said third adsorbent bed as part of said first lower pressure repressurization period of the third bed; introducing oxygen product gas directly from said second absorbent bed to the second end of the depressurized first adsorbent bed as purge and releasing oxygen purging-nitrogen desorbate gas from the first end of said first bed during a reverse outward flow period such that the reverse outward flow period/feed air introduction period time ratio is 0.5 to 1.1; as a first lower pressure repressurization period, terminating the gas release from the first bed first end but continuing introducing oxygen product gas directly from the second bed during the feed air suspension period thereof to the first bed second end, and simultaneously introducing oxygen product gas directly from the third bed during the feed air introduction period thereof to the first bed second end; as a second higher repressurization period, continuing only the introduction of oxygen product gas from the third bed to the first bed second end; thereafter repeating the cycle in the first bed beginning with said feed air introduction period and sequentially passing the second bed and then the third bed each through a corresponding cycle as illustrated in FIG. 6 with a total cycle time for each bed of 2.1 to 3.6 seconds.

6. Apparatus for air separation to produce at least 35 mol percent oxygen product by rapid adiabatic pressure swing adsorption comprising:
 (a) at least two separate adsorbent beds arranged in alternating flow sequence each having an end-to-end bed length of 1 to 3.5 feet, comprising crystalline zeolite molecular sieve of at least 5 Angstroms apparent pore size and 40 to 120 mesh particle size with a feed air inlet first end and an oxygen product gas discharge second end;
 (b) means for supplying compressed feed air at least 10 psig;
 (c) feed air manifold means joined at one end to means (b) and joined at the other end to said first end of each adsorbent bed, and a feed air inlet valve therein upstream said first ends;
 (d) reverse outward flow means joined at one end to said first end of each adsorbent bed and an exhaust gas valve therein downstream said first ends, said means being open at the other end for gas discharge from the apparatus;
 (e) single product gas manifold means joined at one end to said second bed of each adsorbent bed without flow restriction or product storage means for discharging at least part of the product gas from the apparatus at the other end.
 (f) a product gas discharge valve joined to said other end of product manifold means (e); and
 (g) means for sequentially controlling the gas flows through each of said adsorbent beds such that: (i) compressed feed air is introduced through manifold means (c) to the bed first end for selective nitrogen adsorption in the bed and discharge of oxygen product gas at said second end into said product gas manifold means (e) as a feed air introduction period, with part of said product gas flowing backwardly through said product gas manifold means (e) into a second bed second end as a reverse outward flow period for desorption and purging thereof, and discharge as purge-desorbate gas through the second bed exhaust valve (d); (ii) in response to a predetermined control signal the second bed exhaust valve (d) is closed to complete the second bed reverse outward flow period; (iii) in response to another predetermined control signal the first bed inlet valve (c) is closed to complete the first bed feed air introduction period; (iv) in response to another predetermined control signal the inlet valve (c) of the purged second bed is opened to start the second bed feed air introduction period; (v) in response to a further predetermined control signal the first bed exhaust valve (d) is opened to start a reverse outward flow period during which product gas from said second adsorbent bed during its feed air introduction period flows through product gas manifold (e) to the first bed second end for desorption and purging and discharge of purge-desorbate gas; (vi) in response to a still further predetermined control signal the first bed exhaust valve (d) closes to complete the first bed reverse outward flow period; (vii) in response to an additional predetermined control signal the second bed inlet valve (c) is closed to complete the second bed feed air introduction period; (viii) in response to a still additional predetermined control signal the first bed inlet valve (c) is opened to start the feed air introduction period of (i); (ix) in response to a still additional predetermined control signal the second bed exhaust valve (d) is opened to start the reverse outward flow period of (i); and (x) the aforedescribed sequential control means repeat (i) through (ix) all such that each adsorbent bed consecutively proceeds through a corresponding cycle.

7. Apparatus according to claim 6 with only two adsorbent beds (a) such that predetermined control signals (g)-(iii) and (iv) are simultaneous, and the predetermined control signals (g)-(vii) and (viii) are simultaneous.

8. Apparatus according to claim 6 in which control signal (g)-(ii) occurs prior to control signal (g)-(iii) such that product gas flow into said second bed second end is continued as a repressurization period for said second bed, and control signal (g)-(vi) occurs prior to control signal (g)-(vii) such that product gas flow into said first bed second end is continued as a repressurization period for said first bed.

9. Apparatus according to claim 6 in which control signal (g)-(iii) occurs prior to control signal (g)-(v) to provide a first bed feed air suspension period prior to the first bed reverse outward flow period, and control signal (g)-(vii) occurs prior to control signal (g)-(ix) to provide a second bed feed air suspension period prior to the second bed reverse outward flow period.

10. Apparatus for air separation to produce at least 75 mol percent oxygen product by rapid adiabatic pressure swing adsorption comprising:
(a) two separate adsorbent beds arranged in alternating flow sequence each having an end-to-end bed length of 1 to 2 feet, comprising crystalline zeolite molecular sieve of at least 5 Angstroms apparent pore size and and 40 to 80 mesh particle size with a feed air inlet first end and an oxygen product gas discharge second end;
(b) means for supplying compressed feed air at 10 to 50 psig;
(c) feed air manifold means joined at one end to means (b) and joined at the other end to said first end of each adsorbent bed, and a feed air inlet valve therein upstream said first ends;
(d) reverse outward flow means joined at one end to said first end of each adsorbent bed and an exhaust gas valve therein downstream said first ends, said means being open at the other end for gas discharge from the apparatus;
(e) single product gas manifold means joined at one end to said second end of each adsorbent bed without flow restriction or product storage means for discharging from the apparatus at the other end;
(f) a product gas discharge valve adjacent to the other end of said manifold means; and
(g) means for sequentially controlling the gas flows through each of said adsorbent beds such that: (i) compressed feed air is introduced through manifold means (c) to the bed first end for selective nitrogen adsorption in the bed and discharge of oxygen product gas at said second end into said product gas manifold means (e) as a feed air introduction period, with part of said product gas flowing into the second bed second end initially for flow therethrough as a reverse outward flow period for desorption and purging thereof and discharge through the second bed exhaust valves (d); (ii) in response to a predetermined control signal during the first bed feed air introduction period, said second bed first end exhaust valve (d) is closed and the product gas flow into said second bed second end is continued as a repressurization period for said second bed until the pressure therein rises to the product gas discharge pressure from said first bed; (iii) in response to another predetermined control signal the first bed inlet valve (c) is closed to start a first bed feed air suspension period and the repressurized second bed feed air inlet valve (c) is opened to start the second bed feed air introduction period; (iv) in response to a further predetermined control signal the first bed exhaust valve (d) is opened to start a reverse outward flow period during which second bed product gas flows through the first bed for desorption and purging thereof; (v) in response to a still further predetermined control signal during the second bed feed air introduction period the first bed exhaust valve (d) is closed and part of the second bed product gas enters the first bed second end as a product repressurization period for said first bed; (vi) in response to an additional predetermined control signal the second bed inlet valve (c) is closed to start a second bed feed air suspension period and the repressurized first bed feed air inlet valve is opened to start the first bed feed air introduction period, and (vii) the aforedescribed sequential control means repeat sequence (i) through (vi).

11. Apparatus for air separation to produce at least 75 mol percent oxygen product by rapid adiabatic pressure swing adsorption comprising:
(a) three separate adsorbent beds arranged in alternating flow sequence each having an end-to-end bed length of 1 to 2 feet, comprising crystalline zeolite molecular sieve of at least 5 Angstroms apparent pore size and 40 to 80 mesh particle size with a feed air inlet first end and an oxygen product gas discharge second end;
(b) means for supplying compressed feed air at 10 to 50 psig;
(c) feed air manifold means joined at one end to means (b) and joined at the other end to said first end of each adsorbent bed, and a feed air inlet valve therein upstream each of said first ends;
(d) reverse outward flow means joined at at one end to said first end of each adsorbent bed and an exhaust gas control valve therein downstream said first ends, said means being open at the other end for gas discharge from the apparatus;
(e) single product gas manifold means joined at one end to said second end of each adsorbent bed and discharge product gas from the apparatus at the other end;
(f) a product gas discharge valve adjacent the other end of said manifold means; and
(g) means for sequentially controlling the gas flows through each of said adsorbent beds such that: (i) compressed feed air is introduced through manifold means (c) to the bed first end for selective nitrogen adsorption in the bed and discharge of oxygen product gas at said second end into said product gas manifold means (e) as a feed air introduction period, with part of said product gas flowing through the second bed second end into the second bed as a repressurization period for said second bed along with gas released from the third bed second end during a third bed feed air suspension period during only the first lower pressure part of the second bed pressure repressurization period; (ii) in response to a predetermined control signal during the first bed feed air introduction period the third bed exhaust valve (d) is opened for flow of part of the first bed product gas into the third bed second end as a reverse outward flow period for desorption and purging of said third bed; (iii) in response to another predetermined control signal the first bed feed air inlet valve (c) is closed to start a feed air suspension period and the second bed feed air inlet valve (c) is opened to start its feed air introduction period, and at least part of the first bed released gas flows through manifold means (e) to the third bed second end along with oxygen product gas from said second bed as a first lower pressure part of the repressurization period for said third bed; (iv) in response to a further predetermined control signal the first bed exhaust valve (d) is opened to start a reverse outward flow period of second bed oxygen product gas through the first bed for desorption and purging thereof; (v) in response to a still further predetermined control signal the first bed exhaust valve (d) closes, at least part of the gas released from the second bed second end enters the first bed second end during only the part of the first bed repressurization period, and part of the third bed product gas enters the first bed second end during the entire first bed repressurization period; (vi) in response to still another predetermined control signal during the first bed repressurization period the second bed exhaust valve (d) is opened to start a reverse outward flow period of third bed product gas through the second bed for desorption and purging thereof; (vii) the aforedescribed sequential control means repeat sequence (i) through (vi) and the second and third bed air inlet valves (c) and exhaust valves (d) are opened and closed in response to additional predetermined control signals all such that the second bed and then the third bed sequentially proceed through a corresponding cycle as illustrated in FIGS. 5 and 6.

* * * * *